(12) United States Patent
Miloushev et al.

(10) Patent No.: US 7,562,110 B2
(45) Date of Patent: Jul. 14, 2009

(54) FILE SWITCH AND SWITCHED FILE SYSTEM

(75) Inventors: Vladimir I. Miloushev, Laguna Niguel, CA (US); Peter A. Nickolov, Irvine, CA (US)

(73) Assignee: F5 Networks, Inc., Seattle, WA (US)

( * ) Notice: Subject to any disclaimer, the term of this patent is extended or adjusted under 35 U.S.C. 154(b) by 1022 days.

(21) Appl. No.: 10/043,413

(22) Filed: Jan. 10, 2002

(65) Prior Publication Data

US 2002/0120763 A1 Aug. 29, 2002

Related U.S. Application Data

(60) Provisional application No. 60/261,153, filed on Jan. 11, 2001.

(51) Int. Cl.
*G06F 15/16* (2006.01)
*G06F 7/00* (2006.01)

(52) U.S. Cl. .......................................... 709/201; 707/10

(58) Field of Classification Search ......... 709/201–203; 707/10
See application file for complete search history.

(56) References Cited

U.S. PATENT DOCUMENTS

| | | | | |
|---|---|---|---|---|
| 4,993,030 A | | 2/1991 | Krakauer | 371/401 |
| 5,218,695 A | * | 6/1993 | Noveck et al. | 707/205 |
| 5,473,362 A | | 12/1995 | Fitzgerald | 348/7 |
| 5,537,585 A | | 7/1996 | Blickenstaff et al. | 707/205 |
| 5,548,724 A | | 8/1996 | Akizawa et al. | 395/200.03 |
| 5,550,965 A | | 8/1996 | Gabbe et al. | 715/209 |
| 5,583,995 A | | 12/1996 | Gardner | 348/7 |
| 5,590,320 A | * | 12/1996 | Maxey | 707/203 |
| 5,649,194 A | * | 7/1997 | Miller et al. | 707/200 |
| 5,649,200 A | | 7/1997 | Leblang et al. | 395/703 |
| 5,692,180 A | * | 11/1997 | Lee | 707/10 |
| 5,724,512 A | | 3/1998 | Winterbottom | 395/200.12 |
| 5,806,061 A | | 9/1998 | Chaudhuri et al. | 707/3 |
| 5,832,496 A | | 11/1998 | Anand et al. | 707/102 |
| 5,832,522 A | | 11/1998 | Blickenstaff et al. | 707/204 |
| 5,838,970 A | * | 11/1998 | Thomas | 719/316 |
| 5,862,325 A | | 1/1999 | Reed et al. | 709/201 |
| 5,893,086 A | | 4/1999 | Schmuck et al. | 707/1 |
| 5,897,638 A | | 4/1999 | Lasser et al. | 707/102 |

(Continued)

FOREIGN PATENT DOCUMENTS

EP 0 738 970 10/1996

(Continued)

OTHER PUBLICATIONS

CSA Persistent File System Technology, Colorado Software Architecture, Inc. White Paper, Jan. 1999, p. 1-3.*

(Continued)

*Primary Examiner*—Larry D Donaghue
(74) *Attorney, Agent, or Firm*—Nixon Peabody LLP

(57) ABSTRACT

An apparatus and method are provided in a computer network to decouple the client from the server, by placing a transparent network node, also termed a file switch or file switch computer, between the client and the server. Usage of such a file switch allows reduced latency in file transfers, as well as scalable mirroring, striping, spillover, and other features.

21 Claims, 17 Drawing Sheets

U.S. PATENT DOCUMENTS

| | | | | |
|---|---|---|---|---|
| 5,905,990 | A | 5/1999 | Inglett | 707/200 |
| 5,917,998 | A | 6/1999 | Cabrera et al. | 711/114 |
| 5,920,873 | A | 7/1999 | Van Huben et al. | 707/202 |
| 5,999,664 | A | 12/1999 | Mahoney et al. | 382/305 |
| 6,012,083 | A | 1/2000 | Savitzky et al. | 709/202 |
| 6,029,168 | A | 2/2000 | Frey | 707/10 |
| 6,044,367 | A | 3/2000 | Wolff | 707/2 |
| 6,047,129 | A | 4/2000 | Frye | 395/712 |
| 6,078,929 | A * | 6/2000 | Rao | 707/200 |
| 6,085,234 | A | 7/2000 | Pitts et al. | 709/217 |
| 6,128,627 | A * | 10/2000 | Mattis et al. | 707/202 |
| 6,128,717 | A | 10/2000 | Harrison et al. | 711/202 |
| 6,161,145 | A | 12/2000 | Bainbridge et al. | 709/246 |
| 6,181,336 | B1 | 1/2001 | Chiu et al. | 715/736 |
| 6,223,206 | B1 | 4/2001 | Dan et al. | 709/105 |
| 6,233,648 | B1 | 5/2001 | Tomita | 711/4 |
| 6,256,031 | B1 * | 7/2001 | Meijer et al. | 715/854 |
| 6,324,581 | B1 | 11/2001 | Xu et al. | 709/229 |
| 6,339,785 | B1 | 1/2002 | Feigenbaum | 709/213 |
| 6,349,343 | B1 * | 2/2002 | Foody et al. | 719/316 |
| 6,389,433 | B1 | 5/2002 | Bolosky et al. | 707/205 |
| 6,393,581 | B1 | 5/2002 | Friedman et al. | 714/4 |
| 6,397,246 | B1 | 5/2002 | Wolfe | 709/217 |
| 6,438,595 | B1 | 8/2002 | Blumenau et al. | 709/226 |
| 6,477,544 | B1 | 11/2002 | Bolosky et al. | 707/200 |
| 6,493,804 | B1 | 12/2002 | Soltis | 711/152 |
| 6,516,350 | B1 | 2/2003 | Lumelsky | 709/226 |
| 6,516,351 | B2 | 2/2003 | Borr | 709/229 |
| 6,556,998 | B1 | 4/2003 | Mukherjee et al. | 707/10 |
| 6,601,101 | B1 * | 7/2003 | Lee et al. | 709/227 |
| 6,612,490 | B1 * | 9/2003 | Herrendoerfer et al. | 235/407 |
| 6,721,794 | B2 | 4/2004 | Taylor | 709/231 |
| 6,742,035 | B1 | 5/2004 | Zayas et al. | 709/226 |
| 6,757,706 | B1 * | 6/2004 | Dong et al. | 709/203 |
| 6,775,679 | B2 | 8/2004 | Gupta | 707/102 |
| 6,782,450 | B2 | 8/2004 | Arnott et al. | 711/114 |
| 6,801,960 | B1 | 10/2004 | Ericson | 710/33 |
| 6,826,613 | B1 * | 11/2004 | Wang et al. | 709/227 |
| 6,847,970 | B2 | 1/2005 | Keller et al. | 707/100 |
| 6,889,249 | B2 * | 5/2005 | Miloushev et al. | 709/213 |
| 6,922,688 | B1 * | 7/2005 | Frey, Jr. | 707/2 |
| 6,985,936 | B2 | 1/2006 | Agarwalla | 709/221 |
| 6,985,956 | B2 | 1/2006 | Luke et al. | 709/229 |
| 6,990,547 | B2 | 1/2006 | Ulrich et al. | 710/304 |
| 6,990,667 | B2 | 1/2006 | Ulrich et al. | 718/105 |
| 7,051,112 | B2 | 5/2006 | Dawson | 709/232 |
| 7,072,917 | B2 | 7/2006 | Wong et al. | 707/205 |
| 7,146,524 | B2 | 12/2006 | Patel et al. | 714/6 |
| 7,194,579 | B2 | 3/2007 | Robinson | 711/114 |
| 7,284,150 | B2 | 10/2007 | Ma et al. | 714/6 |
| 2002/0120763 | A1 | 8/2002 | Miloushev et al. | 709/230 |
| 2002/0161911 | A1 | 10/2002 | Pinckney et al. | 709/231 |
| 2003/0009429 | A1 | 1/2003 | Jameson | 706/45 |
| 2003/0028514 | A1 | 2/2003 | Lord et al. | 707/1 |
| 2003/0033308 | A1 | 2/2003 | Patel et al. | 707/10 |
| 2003/0135514 | A1 | 7/2003 | Patel et al. | 707/102 |
| 2004/0006575 | A1 | 1/2004 | Visharam et al. | 707/104.1 |
| 2004/0025013 | A1 | 2/2004 | Parker et al. | 713/163 |
| 2004/0028043 | A1 | 2/2004 | Maveli et al. | 370/392 |
| 2004/0028063 | A1 | 2/2004 | Roy et al. | 370/402 |
| 2004/0030857 | A1 | 2/2004 | Krakirian et al. | 711/206 |
| 2004/0098383 | A1 | 5/2004 | Tabellion et al. | 707/3 |
| 2004/0133577 | A1 | 7/2004 | Miloushev et al. | 707/10 |
| 2004/0133607 | A1 | 7/2004 | Miloushev et al. | 707/200 |
| 2004/0236798 | A1 | 11/2004 | Srinivasan et al. | 707/200 |
| 2005/0021615 | A1 | 1/2005 | Arnott et al. | 709/203 |
| 2005/0050107 | A1 | 3/2005 | Mane et al. | 707/200 |

FOREIGN PATENT DOCUMENTS

| | | |
|---|---|---|
| JP | 06-332782 | 12/1994 |
| JP | 08-328760 | 12/1996 |
| JP | 08-339355 | 12/1996 |
| WO | WO 02/056181 A2 * | 7/2002 |
| WO | WO 2004/061605 A2 * | 7/2004 |

OTHER PUBLICATIONS

Scaling Next Generation Web Infrastructure with Content-Intelligent Switching, Alteon Web Systems, Inc., White Paper, Apr. 2000, p. 1-9.*

The Design and Performance of Shared Disk File System for IRIX, Soltis, S., et. al., 6th NASA Goddard Space Flight Center Conf. on Mass Storage & Technologies, IEEE Symposium on Mass Storage Systems, Mar. 1998, p. 1-17.*

An Architecture for Scalable and Manageable File Services, Karamanolis, C., et. al., HPL-2001-173, Jul. 26, 2001. p. 1-14.*

Automated Client-Side Integration of Distributed Application Servers, Kimball, C.E., et. al. 13TH LISA Conf., 1999.*

Cabrera et al., "Swift: Using Distributed Disk Striping to Provide High I/O Data Rates," *Computing Systems* (1991) 4:405-436.

Noghani et al., "A Novel Approach to Reduce Latency on the Internet: 'Component-Based Download'," Proceedings of the Int'l Conf. on Internet Computing, Las Vegas, NV, Jun. 2000, pp. 1-6.

Fan et al., "Summary Cache: A Scalable Wide-Area Web Cache Sharing Protocol," Computer Communications Review, Association for Computing Machinery, New York, USA, Oct. 1998, vol. 28, No. 4, pp. 254-265.

Rodriguez et al., "Parallel-Access for Mirror Sites in the Internet," IEEE Infocom 2000, Mar. 26, 2000, pp. 864-873.

English Translation of Notification of Reason(s) for Refusal for JP 2002-556371 (Jan. 17, 2007).

English Translation of paragraphs 17, 32, and 40-52 of JP 08-328760 (Dec. 13, 1996).

English Language Abstract of JP 08-328760 from Patent Abstract of Japan (Dec. 13, 1996).

English Language Abstract of JP 08-339355 from Patent Abstract of Japan (Dec. 24, 1996).

Callaghan et al., "NFS Version 3 Protocol Specifications" (RFC 1813), 1995, The Internet Engineering Task Force (IETF), www.jetf.org, last accessed on Dec. 30, 2002.

Norton et al., "CIFS Protocol Version CIFS-Spec 0.9", 2001, Storage Networking Industry Association (SNIA), www.snia.org, last accessed on Mar. 26, 2001.

Stakutis, C., "Benefits of SAN-based filed system sharing", Jul. 2000, InfoStor, www.instor.com last accessed on Dec. 30, 2002.

Haskin et al., "The Tiger Shark File System", 1996, in proceedings of IEEE, Spring COMPCON, Santa Clara, CA, www.research.ibm.com, last accessed on Dec. 30, 2002.

Peterson, M., "Introducing Storage Area Networks", Feb. 1998, InfoStor, www.infoster.com, last accessed on Dec. 20, 2002.

Patterson et al., "A case for redundant arrays of inexpensive disks (RAID)", Chicago, Illinois, Jun. 1-3, 1998, in proceedings of ACM SIGMOD conference on the Management of Data, pp. 109-116, Association for Computing Machinery, Inc., www.acm.org, last accessed on Dec. 20, 2002.

Farley, M., "Building Storage Networks", Jan. 2000, McGraw Hill, ISBN 0072120509, "Auspex Storage Architecture Guide", Second Edition, 2001, Auspex Systems, Inc., www.auspex.com, last accessed on Dec. 30, 2002.

"Windows Clustering Technologies-An Overview", Nov. 2000, Microsoft Corp., www.microsoft.com, last accessed on Dec. 30, 2002.

Steven Soltis, et al., "The Global File System", in Proceedings of the Fifth NASA Goddard Space Flight Center Conference on Mass Storage Systems and Technologies, Sep. 17-19, 1996, College Park, Maryland.

Preslan et al., "Scalability and Failure Recovery in a Linux Cluster File System", in Proceedings of the 4th Annual Linux Showcase & Conference, Atlanta, Georgia, Oct. 14, 2000, www.usenix.org, last accessed on Dec. 20, 2002.

Zayas, E., "AFS-3 Programmer's Reference: Architectural Overview", Transarc Corp., version 1.0 of Sep. 2, 1991, doc. . No. FS-00-D160.

"The AFS File System in Distibuted Computing Enviroment", Ma??96, Transarc Corp. www.transarc.ibm.com, last accessed on Dec. 20, 2002.

"Veritas SANPoint Foundation Suite(tm) and SANPoint Foundation(tm) Suite HA: New VERITAS Volume Management and File System Technology for Cluster Environments", Sep. 2001, VERITAS Software Corp.

"Distributed File System: Logical View of Physical Storage: White Paper", 1999, Microsoft Corp., www.microsoft.cm, last accessed on Dec. 20, 2002.

Anderson et al., "Serverless Network File System", in the 15$^{th}$ Symposium on Operating Systems Principles, Dec. 1995, Association for Computing Machinery, Inc.

Gibson et al., "NASD Scalable Storage Systems", Jun. 1999, USENIX99, Extreme Linux Workshop, Monterey, California.

Gibson et al., "File Server Scaling with Network-Attached Secure Disks", in Proceedings of the ACM International Conference on Measurement and Modeling of Computer Systems (Sigmentrics '97), 1997, Association for Computing Machinery, Inc.

Cabrera et al., "Swift: Storage Architecture for Large Objects", In Proceedings of the Eleventh IEEE Symposium on Mass Storage Systems, pp. 123-128, Oct. 1991.

Cabrera et al., "Using Data Striping in a Local Area Network", 1992, technical report No. UCSC-CRL-92-09 of the Computer & Information Sciences Department of University of California at Santa Cruz.

Long et al., "Swift/RAID: A distributed RAID System", Computing Systems, vol. 7, pp. 333-359, Summer 1994.

Hartman, J., "The Zebra Striped Network File System", 1994, Ph.D. dissertation submitted in the Graduate Division of the University of California Berkeley.

Carns et al., "PVFS: A Parallel File System For Linux Clusters", in Proceedings of the 4$^{th}$ Annual Linux Showcase and Conference, pp. 317-327, Atlanta, Georgia, Oct. 200, USENIX Association.

"NERSC Tutorials: I/O on the Cray T3E", chapter 8, "Disk Striping", National Energy Research Scientific Computing Center (NERSC), http://hpcf.nersc,gov, last accessed on Dec. 27, 2002.

Thekkath et al., "Frangipani: A Scalable Distributed File System", in Proceedings of the 16$^{th}$ ACM Symposium on Operating Systems Principles, Oct. 1997, Association for Computing Machinery, Inc.

Hwang et al., Designing SSI Clusters with Hierarchical Checkpointing and Single I/O Space, IEEE Concurrency, pp. 60-69, Jan.-Mar. 1999.

Cavale, M. R., "Introducing Microsoft Cluster Service (MSCS) in the Windows Server 2003," Microsoft Corporation, Nov. 2002.

Pearson, P.K., "Fast Hashing of Variable-Length Text Strings", Comm. of the ACM, vol. 33, No. 6, Jun. 1990

Sorenson, K.M., "Installation and Administration: Kimberlite Cluster Version 1.1.0, Rev. D." Mission Critical Linux, http://oss.missioncriticallinux.com/kimberlite/kimberlite.pdf.

Wilkes, J., et al., "The HP AutoRAID Hierarchical Storage System," ACM Transactions on Computer Systems, vol. 14, No. 1, Feb. 1996.

Savage, et al., "AFRAID- A Frequently Redundant Array of Inexpensive Disks," 1996 USENIX Technical Conf., San Diego, California, Jan. 22-26, 1996.

U.S. Appl. No. 10/043,413 filed Jan. 10, 2002, File Switch and Switched File System, Vladimir Miloushev, Peter Nickolov.

U.S. Appl. No. 10/336,704 filed Jan. 2, 2003, Transaction Aggregation in a Switched File System, Vladimir Miloushev, Peter Nickolov.

U.S. Appl. No. 10/336,833 filed Jan. 2, 2003, Directory Aggregation for Files Distributed Over a Plurality of Servers in a Switched File System, Vladimir Miloushev, Peter Nickolov.

U.S. Appl. No. 10/336,835 filed Jan. 2, 2003, Metadata Based File Switch and Switched File System, Vladimir Miloushev, Peter Nickolov.

U.S. Appl. No. 10/336,832 filed Jan. 2, 2003, Rule Based Aggregation of Files and Transactions in a Switched File System, Vladimir Miloushev, Peter Nickolov.

U.S. Appl. No. 10/336,834 filed Jan. 2, 2003, Aggreated Lock Management for Locking Aggregate Files in a Switched File System, Vladimir Miloushev, Peter Nickolov.

U.S. Appl. No. 10/336,784 filed Jan. 2, 2003, Aggreated Opportunistic Lock and Aggregated Implicit Lock Management for Locking Aggregated Files in a Switched File System, Vladimir Miloushev, Peter Nickolov.

U.S. Appl. No. 11/337,190 filed Jan. 20, 2006, Scalable System for Partitioning and Access Metadata Over Multiple Servers, Francesco Lacapra.

U.S. Appl. No. 11/041,147 filed Jan. 21, 2005, File-based Hybrid File Storage Scheme Supporting Multiple file Switches, Francesco Lacapra.

U.S. Appl. No. 11/072,892 filed Mar. 3, 2005, System and Method for Managing Small-Size if an Aggregated File System, Francesco Lacapra, Srinivas Duvvuri.

U.S. Appl. No. 11/285,677filed Nov. 11, 2005, Directory Aggregation for Files Distributed Over a Plurality of Servers in a Switched File System, Vladimir Miloushev, Peter Nickolov.

U.S. Appl. No. 11/724,107 filed Mar. 14, 2007, Transaction aggregation in a switched file system, Vladimir Miloushev, Peter Nickolov.

Aguilera, Marcos K. et al., Improving recoverability in multi-tier storage systems, International Conference on Dependable Systems and Networks (DSN-2007), Edinburgh, Scotland, Jun. 2007, 10 pages.

Anderson, Darrell C. et al., Interposed Request Routing for Scalable Network Storage, ACM Transactions on Computer Systems, vol. 20, No. 1, Feb. 2002, pp. 1-24.

Katsurashima, W. et al., NAS Switch: A Novel CIFS Server Virtualization, Proceedings. 20th IEEE/11th NASA Goddard Conference on Mass Storage Systems and Technologies, 2003 (MSST 2003), Apr. 2003.

J. Klayman, Jan. 18, 2007 e-mail to Japanese associate including instructions for response to office action dated Jan. 22, 2007 in corresponding Japanese patent application No. 2002-556371.

Response filed by Japanese associate to office action dated Jan. 22, 2007 in corresponding Japanese patent application No. 2002-556371.

H. Uesugi, Jan. 15, 2008 letter from Japanese associate reporting office action dated May 26, 2008 in corresponding Japanese patent application No. 2002-556371.

Office action dated May 26, 2008 in corresponding Japanese patent application No. 2002-556371.

English translation of office action dated May 26, 2008 in corresponding Japanese patent application No. 2002-556371.

J. Klayman, Nov. 13, 2008 e-mail to Japanese associate including instructions for response to office action dated May 26, 2008 in corresponding Japanese patent application No. 2002-556371.

H. Uesugi, Nov. 25, 2008 argument filed by Japanese associate in response to office action dated May 26, 2008 in corresponding Japanese patent application No. 2002-556371.

H. Uesugi, Nov. 25, 2008 amendment filed by Japanese associate in response to office action dated May 26, 2008 in corresponding Japanese patent application No. 2002-556371.

V. Korkuzas, Communication pursuant to Article 96(2) EPC dated Nov. 9, 2007 in corresponding European patent application No. 02718824.2.

C. Harrison, May 19, 2008 response to Communication pursuant to Article 96(2) EPC dated Nov. 9, 2007 in corresponding European patent application No. 02718824.2.

* cited by examiner

SYNTAX 1300

(PATH, TYPE) → (N MIRRORS, N STRIPES, STRIPE SZ)

EXAMPLES 1301 (*, MPEG) → (2, 32, 16,384)
1302 (*, HTML) → (64, 1, 0)
1303 (*, DOC) → (3, 8, 8,192)
1304 (\CODEBASE\*,*) → (4, 1, 0)
1305 (\CODEBASE\*,OBJ) → (1, 1, 0)

FIG. 13

FILE SWITCH AND SWITCHED FILE SYSTEM

This application claims priority from U.S. Provisional Patent Application No. 60/261,153, entitled FILE SWITCH AND SWITCHED FILE SYSTEM and filed Jan. 11, 2001, the disclosure of which is incorporated herein by reference.

BACKGROUND OF THE INVENTION

1. Field of the Invention

The present invention relates generally to the field of storage networks, and more specifically to file switching and switched file systems.

2. Description of the Related Art

Since the birth of computer networking, access to storage has remained among the most important network applications. The reason is simple: the purpose of networks was and is to share data and content, and most of the data worth sharing resides on some form of storage.

Despite the importance of storage applications in networks, their usefulness has, until recently, been greatly limited by the insufficient bandwidth provided by networks. Even at 100 Megabits/second (Mbps) (the most common maximum speed in existing local area networks, also known as Fast Ethernet), accessing data through a network is several times slower than reading it from a hard disk attached locally to a computer. For this reason, historically most of the data accessed by a networked computer (workstation or application server—often referred to as a "client") has resided on local storage and only data that has to be shared has resided on network servers.

The introduction of Gigabit network technology, however, is changing the rules of the game. A single Gigabit Ethernet or FibreChannel connection is capable of transporting data at aggregate rates of up to 240 Megabytes/second (MB/s), which is much greater than the performance of most locally attached storage devices. This means that in Gigabit networks, data can be accessed through the network much faster than from local storage. As a result, we have now reached the beginning of a fundamental trend in which the majority of useful data is being moved to the network.

Storage Networks

The ability to store terabytes of data on the network and make that data accessible to tens and hundreds of thousands of users is extremely attractive. At the same time, creating storage and network systems capable of adequately handling such amounts of information and usage loads is not a simple task. As a result, storage networking—the discipline that deals with designing, building and managing such systems—is rapidly becoming recognized as a separate, specialized field of computer networking.

Introduction to the field of storage networking can be found in "Introducing Storage Area Networks", Michael Peterson, in February 1998 issue of InfoStor magazine, PennWell Corp., and in "Building Storage Networks", Marc Farley, January 2000, McGraw-Hill, ISBN 0072120509. For an excellent overview of storage network architectures, please see "Auspex Storage Architecture Guide", Second Edition, 2001, Auspex Systems, Inc. For a thorough background on the field and its business implications, as well as for a comparative analysis of current technologies, see "System Area Networks: The Next Generation of Scale in the Data Center", Robert M. Montague, et al., Jul. 26, 2001, Dain Rauscher Wessels Equity Capital Markets.

The key promise of storage networking is in delivering network systems that enable the sharing of huge amounts of information and content among geographically dispersed users. To deliver on this promise, the storage network systems have to be extremely scalable while providing a high degree of availability comparable to that of the public telephone system. In addition, any system of this scale has to be designed so that it can be managed effectively.

In general, there are two distinct ways of providing storage services to the network: "network disk" and "network file". In the first approach, network clients are given access to "raw" storage resources generally addressable as arrays of fixed-size data blocks. In the second approach, clients are provided with a protocol, such as NFS and CIFS, for accessing file system services. The NFS protocol is described in "NFS Version 3 Protocol Specification" (RFC 1813), B. Callaghan, et al., June 1995, The Internet Engineering Task Force (IETF). The CIFS protocol is described in "CIFS Protocol Version CIFS-Spec 0.9", Jim Norton, et al., March 2001, Storage Networking Industry Association (SNIA). These protocols typically provide security, hierarchical directories, the ability to create, open and close individual named files, and access to data within such files. In most systems, clients can view each file as a separate, extensible array of bytes. File access protocols also provide the ability to mediate concurrent access to the same file by multiple clients.

The "network disk" approach is the foundation of the storage networking architecture commonly known as SAN (Storage Area Networks), while the "network file" approach is in the core of several architectures, including NAS (Network Attached Storage) and distributed file systems.

Currently, none of the available architectures is capable of adequately delivering on the promise of storage networking. Storage area networks scale relatively well; however, sharing data in SAN remains extremely difficult for reasons described below. NAS and distributed file systems, also discussed further below, are excellent in sharing data but have proven very difficult to scale in terms of performance and bandwidth. Because of these limitations, both types of systems are very cumbersome to manage. As a result, today a single storage administrator faces a challenge in managing only 80 gigabytes of data, and the cost and the cost and complexity of managing terabyte systems is astronomical.

Early applications of storage networking were focused on database storage such as on-line transaction processing, data mining, customer data, etc. In these applications, SAN remains the most common architecture. Today's applications, such as e-mail, document repositories, CAD/CAM, digital still images and digital video production, streaming high-resolution (HDTV) video, XML-based "soft-structured" data, and many others, are increasingly file-based. As a result, high-performance, high-availability network file services are becoming increasingly important.

Available Approaches to Scaling File Systems

The primary function of every file system is to enable shared access to storage resources. In fact, file systems were originally created to facilitate sharing of then-expensive storage between multiple applications and multiple users. As a result, when exposed as a network service, file systems provide a complete and mature solution to the problem of sharing data.

The flip side is that file systems are complex and very processing-intensive, which increases substantially the performance requirements to any computer that provides file services over a fast network. To serve files to hundreds and thousands of users simultaneously requires tremendous amounts of processing power, memory and bus bandwidth.

Because of the importance and magnitude of the problem, over the last fifteen years a number of different approaches have been tried. An excellent overview of the key issues associated with building network file systems and the various file system architectures can be found in "The Zebra Striped Network File System", John Henry Hartman, 1994, Ph.D. dissertation submitted in the Graduate Division of the University of California at Berkeley. The known available approaches generally each fall into one of three broad categories: single box solutions, cluster file systems and distributed file systems.

FIG. 17 illustrates a typical application of presently available, commonly used network file systems. The system consists of a local area network 1700, which connects a large number of client workstations 1701 and a number of application servers 1702, connected to various file servers. The file servers typically include standalone servers such as 1703 and 1704, as well as file servers, such as 1705 and 1706, configured as a cluster 1710 with shared storage 1707. The servers 1705 and 1706 are connected together through a high-speed, low-latency intra-cluster connection 1709, and are also connected to the shared storage 1707 through a SAN, typically using optical (FibreChannel) interconnect, such as 1708. In addition, clients 1701, application servers 1702 and file servers 1703 through 1706 may be configured to be part of a distributed file system with the appropriate software services installed on all of those machines.

Single Box Solutions

Single box solutions provide a simple and straightforward approach to the problem of increasing the performance of file servers. Traditionally, the fastest available computers were used to serve files; when even these became insufficient, specialized architectures were built to extend the capabilities of the server. Where one processor was not enough, more processors were added; where the bandwidth of a standard bus was not sufficient, additional busses or even custom-designed wider busses were introduced, and so on.

The result of this approach is that high-end file servers are essentially massively multiprocessing supercomputers, with all the associated costs and complexity. Examples of single box solutions are the EMC Celera/Symmetrix, SGI Origin, HP Superdome, Intel Paragon and IBM SP, the trademarks of which are hereby acknowledged.

However, high-performance multiprocessing file servers quickly run into the performance limits of their storage subsystems. The approach to resolving this bottleneck is to spread the load among multiple hard disks and data paths operating in parallel. RAID and parallel file systems such as Cray T3E I/O system and PVFS are the results of this approach. RAID is described in "A case for redundant arrays of inexpensive disks (RAID)", D. Patterson, et al., in Proceedings of ACM SIGMOD conference on the Management of Data, pp. 109-116, Chicago, Ill., Jun. 1-3, 1998, Association for Computing Machinery, Inc. The Cray T3E I/O system is described in "NERSC Tutorials: I/O on the Cray T3E", chapter 8, "Disk Striping", National Energy Research Scientific Computing Center (NERSC). The PVFS is described in "PVFS: A Parallel File System for Linux Clusters", Philip H. Carns, et al., in Proceedings of the 4th Annual Linux Showcase and Conference, pages 317-327, Atlanta, Ga., October 2000, USENIX Association.

Single-box solutions are subject to several serious problems. First, because of the extremely high complexity and the need to develop custom silicon in order to satisfy performance requirements, single box solutions are hideously expensive. Worse, their development cycles are exceedingly long, virtually guaranteeing that they will be "behind the curve" in many important aspects, such as software technologies, protocols, etc., by the time they are generally commercially available. Since storage requirements effectively double every year or so, these boxes often become obsolete long before the customers manage to depreciate their high cost.

Cluster File Systems

An alternative to scaling the server architecture within the box is to put together multiple servers accessing the same pool of storage over a fast interconnect such as HIPPI or FibreChannel. The result is a "cluster" of computers that acts in many aspects similarly to a multiprocessing supercomputer but can be assembled from generally available components.

Since all computers in a cluster access the same set of hard disks, the file system software in each of them has to cooperate with the other members of the cluster in coordinating the access and allocation of the storage space. The simplest way to approach this problem is to section the storage pool and divide it among the different computers in the cluster; this approach is implemented in Windows clustering described in "Windows Clustering Technologies—An Overview", November 2000, Microsoft Corp. More sophisticated approaches result in specialized cluster file systems, such as PVFS [see Carns, et al. above], Tigershark, GFS, VERITAS SANPoint Foundation, xFS, and Frangipani. Tigershark is described in "The Tiger Shark File System", Roger L. Haskin, Frank B. Schmuck, in Proceedings of IEEE 1996, Spring COMPCON, Santa Clara, Calif., February 1996. GFS is described in "The Global File System", Steven Soltis, et al., in Proceedings of the Fifth NASA Goddard Space Flight Center Conference on Mass Storage Systems and Technologies, Sep. 17-19, 1996, College Park, Md., and "The Design and Performance of a Shared Disk File System for IRIX", Steve Soltis, et al., in Sixth NASA Goddard Space Flight Center Conference on Mass Storage and Technologies in cooperation with the Fifteenth IEEE Symposium on Mass Storage Systems, Mar. 23-26, 1998. VERITAS SANPoint Foundation is described in "VERITAS SANPoint Foundation Suite(tm) and SANPoint Foundation(tm) Suite HA: New VERITAS Volume Management and File System Technology for Cluster Environments", September 2001, VERITAS Software Corp. xFS is described in "Serverless Network File System", Thomas E. Anderson, et al., in the 15th Symposium on Operating Systems Principles, December 1995, Association for Computing Machinery, Inc. Frangipani is described in "Frangipani: A Scalable Distributed File System", Chandramohan A. Thekkath, et al., in Proceedings of the 16th ACM Symposium on Operating Systems Principles, October 1997, Association for Computing Machinery, Inc. The benefits of cluster file systems, as well as their key problems and approaches to solving them are described in "Scalability and Failure Recovery in a Linux Cluster File System", Kenneth W. Preslan, et al., in Proceedings of the 4th Annual Linux Showcase & Conference, Atlanta, Ga., Oct. 10-14, 2000, in "Benefits of SAN-based file system sharing", Chris Stakutis, in July 2000 issue of InfoStor magazine, PennWell Corp., and in "Designing SSI Clusters with Hierarchical Checkpointing and Single I/O Space", Kai Hwang, et al., IEEE Concurrency, pp. 60-69, January-March 1999.

The main challenge in all of the above-mentioned file systems comes from the need to frequently synchronize and coordinate access to the storage among all members of the cluster. This requires a centralized lock manager and/or a file manager that controls the allocation of disk space to different files and other shared metadata (data describing data). These components quickly become the major bottleneck that prevents scaling of the cluster file systems beyond 16 or so nodes.

To relieve this problem, several designs move substantial portions of the file manager functionality either into the storage subsystem or into the client software. Examples of this approach are Zebra [see Hartman, above], Swift, and NASD. Swift is described in "Swift: A Storage Architecture for Large Objects", Luis-Felipe Cabrera, Darrell D. E. Long, In Proceedings of the Eleventh IEEE Symposium on Mass Storage Systems, pages 123-128, October 1991, and in "Swift/RAID: A distributed RAID system", D. D. E. Long, et al., Computing Systems, vol. 7, pp. 333-359, Summer 1994. NASD is described in "NASD Scalable Storage Systems", Garth A. Gibson, et al., June 1999, USENIX99, Extreme Linux Workshop, Monterey, Calif., and in "File Server Scaling with Network-Attached Secure Disks", Garth A. Gibson, et al., in Proceedings of the ACM International Conference on Measurement and Modeling of Computer Systems (Sigmetrics '97), 1997, Association for Computing Machinery, Inc. Although none of these approaches has been successfully commercialized as of the time of this writing, the available data suggests that they would scale better than the traditional cluster file systems.

The reliance on centralized resource coordination is the primary weak point of the cluster file systems that limits severely their scalability. Solutions that partially relieve this problem introduce other problems, including custom functionality in storage subsystems and specialized client-side software. If any of these approaches is commercialized, the requirement for using proprietary storage subsystems will have substantial negative effect on both adoption and price, while the need to rely on proprietary client-side software that has to be installed in every client accessing the system make the system fragile, prone to security breaches and hard to deploy and support.

Distributed File Systems

Both single box solutions and cluster file systems are tightly coupled systems that exhibit serious scalability limitations. Creating distributed file systems is an approach attempting to combine hundreds of file servers in a unified system that can be accessed and managed as a single file system. Examples of distributed file systems are the Andrew File System, and its derivatives AFS and Coda, Tricord, as well as the Microsoft Distributed File System DFS. AFS and Coda are described in "The AFS File System in Distributed Computing Environment", May 1, 1996, Transarc Corp., and in "AFS-3 Programmer's Reference: Architectural Overview", Edward R. Zayas, Transarc Corp., version 1.0 of Sep. 2, 1991, doc. number FS-00-D160. Tricord is described in U.S. Pat. No. 6,029,168 to Frey, issued Feb. 22, 2000, and entitled "Decentralized file mapping in a striped network file system in a distributed computing environment." The Microsoft DFS is described in "Distributed File System: A Logical View of Physical Storage: White Paper", 1999, Microsoft Corp.

Distributed file systems are loosely coupled collections of file servers that can be located in diverse geographical locations. They provide a unified view of the file namespace, allowing clients to access files without regard to where in the system those files reside. In addition, the system administrator can move files from one server to another in a transparent fashion and replicate files across multiple servers for increased availability in case of partial system failure.

Distributed file systems exhibit excellent scalability in terms of storage capacity. It is easy to add new servers to an existing system without bringing it off-line. In addition, distributed file systems make it possible to connect storage residing in different geographical locations into a single cohesive system.

The main problem with available distributed file systems is that they do not scale in performance nearly as well as they scale in storage capacity. No matter how large the number of servers in the system, each individual file resides on exactly one server. Thus, the performance the distributed file system can deliver to a single client (workstation or application server) is limited by the performance of the utilized individual file servers, which, considering the large number of servers involved, is not likely to be a very high performance machine.

Another problem that has great impact in commercial environments is the fact that most distributed file systems require specialized client-side software that has to be installed and configured properly on each and every client that is to access the file system. This tends to create massive versioning and support problems.

Moreover, distributed file systems are very prone to "hotspotting". Hotspotting occurs when the demand for an individual file or a small set of files residing on a single server increases dramatically over short period of time, resulting in severe degradation of performance experienced by a large number of users.

Yet another problem with distributed file systems is in their low manageability. Although most aspects of the distributed file systems can be managed while the system is on-line, the heterogeneous and distributed nature of these systems effectively precludes any serious automation of the management tasks. As a result, managing distributed file systems requires large amount of highly qualified labor.

SUMMARY

Although many approaches to scaling network file systems have been taken over the last 15 years, none has succeeded in delivering on the high performance, high scalability and simple management promise of storage networking. Analysis of the systems described above shows that all of their limitations can be traced to a small set of fundamental flaws, namely, all available systems suffer from at least one of the following problems:

1. One file, one server. The inability to utilize multiple file servers in handling requests for a single file limits severely the throughput available to any single client and does not allow the system to balance the load across all available processing resources.
2. Centralized arbitration and metadata management. The need to arbitrate access to storage and the shared data structures used to manage it creates a bottleneck that severely limits the scalability of the system.
3. Proprietary client-side software. The need to buy, install, configure and support a nontrivial piece of software across all client machines running multiple different operating systems creates serious barrier for adoption.

Layer 7 Switching

In IP networks, scalability problems are typically solved through switching. In recent years, intelligent layer 7 switches have been used extremely successfully to solve scalability issues in another network service, namely, web sites. In particular, Alteon WebSystems pioneered the concept of web switches, as described in "Scaling Next Generation Web Infrastructure with Content-Intelligent Switching: White Paper", April 2000, Alteon WebSystems, Inc. Web switches are used to scale high traffic web sites by aggregating hundreds of commodity HTTP servers into a single, high-performance virtual web server.

Web switches operate by tracking and switching TCP connections and whole HTTP protocol transactions on these connections, distinguishing them from Ethernet and IP switches, which operate on network layers 2 and 3 and switch individual network packets. By identifying and switching HTTP transactions, web switches distribute the load among multiple HTTP servers while ensuring the continuity of the individual client's session and the state associated with it, such as shopping carts, access to e-mail accounts through HTTP interface, etc.

The use of web switches results in network systems that have proven to be extremely scalable. By way of example, www.hotmail.com serves over 60 million active users with a system built from hundreds of commodity PC-based web servers combined together in an IP network.

Unfortunately, because of several fundamental limitations in the available technology, web switches cannot be used to scale network file systems. First, web switches direct each individual protocol transaction to a single server, which precludes the use of multiple servers in parallel to deliver high aggregate performance and/or availability to an individual client. Second, HTTP transactions can be directed to any available server while file protocol transactions have to be routed to a specific server on which the file resides. Third, unlike HTTP transactions, file protocols generally use multiple levels of nested transactions (e.g., connection, login, mount, file open, lock) that have to be tracked and switched in a coordinated fashion. Finally, unlike HTTP which is atomic with respect to the objects it manipulates, the semantics of file protocols require ability to access and modify various aspects of directories, file objects and data independently and concurrently by multiple users.

CONCLUSIONS

With the mass adoption of gigabit network infrastructure, storage networking is rapidly becoming key to delivering and managing content on the network. To achieve this, storage networks have to facilitate sharing of data among hundreds of thousands of users, be able to scale in storage capacity, performance and access bandwidth extremely well, provide very high degree of availability, and be easy to manage. Increasingly, new applications, such as email, streaming video content, document repositories, and other soft-structured data, require these characteristics to be achieved by a network service that provides access to files.

The existing approaches to scaling network file systems are successful in solving one or another aspect of these requirements. However, there is no currently available system that can deliver all characteristics needed for storage networking to achieve its promise.

SUMMARY OF THE INVENTION

In a network, it is therefore advantageous to decouple the client from the server, by placing a network node, also termed file switch, file switch computer or file aggregator, in between the client and the server. Usage of such a file switch allows various aspects of the present invention to be advantageously implemented.

One aspect of the present invention is a network node that switches network protocol traffic by receiving the first network frame of a multiframe file protocol request, examining the file protocol header of that request, determining how or where the remaining frames of the request are to be forwarded and then forwarding each of those frames as it is received based on this determination.

Another aspect of the present invention is a network node that switches network file protocol transactions initiated by a network client by receiving the protocol requests, examining the file protocol headers and forwarding those requests to multiple independent file servers based on the information found in those headers.

Another aspect of the present invention is a network node that aggregates network file protocol transactions initiated by a network client by receiving the protocol requests, examining the file protocol headers and initiating multiple file protocol transactions with different independent file servers, aggregating the responses from those servers, and completing the client transaction using the aggregated result.

Another aspect of the present invention is a network node that switches network file protocol transactions by acting as a server within said network file protocol while interacting with clients, switching the requests received from those clients among multiple file servers based on information contained in the respective file protocol headers, and acting as a client within said network file protocol while interacting with said servers.

Another aspect of the present invention is a network node that aggregates multiple files that reside on different and independent file servers and presents them as a single file to network clients by receiving network file protocol requests from said clients and switching or aggregating among said file servers, as the case may be, the transactions that these requests initiate.

Another aspect of the present invention is a network node that aggregates multiple files that reside on different and independent file servers and presents them as a single file to network clients by receiving and initiating network file protocol requests.

Another aspect of the present invention is a network node that aggregates directories residing on different independent file servers and presents them as a single directory to network clients by switching directory enumeration transactions of a network file protocol initiated by said clients, among said servers, to achieve concatenation of their directory contents; and selecting on which of said servers an individual file that belongs to the aggregated directory must reside using only data available within said network node at the time said selection is being made.

Another aspect of the present invention is a network node that aggregates the namespaces of multiple independent file servers and presents them as a single, unambiguous namespace to network clients by switching file protocol transactions initiated by said clients among said servers using only file system paths contained in said transactions and information available within said network node at the time the switching decision is being made.

Another aspect of the present invention is a network node that achieves atomic behavior of aggregated network file protocol transactions with respect to other network file protocol transactions that target the same file system entity by aggregating in a deterministic way the results of the aggregated transactions so that only one of the multiple concurrent transactions attempted on the same entity may succeed.

Another aspect of the present invention is a network node that aggregates the performance and storage capacity of multiple independent file servers by switching and aggregating network file protocol transactions that are initiated by a network client, targeting the same file.

Another aspect of the present invention is a network node that increases the availability of a network file service by aggregating file write transactions initiated by a network client so that the file data carried by said transactions is replicated on a set of independent file servers; and, switching file read transactions initiated by said client to an available file server from said set.

Another aspect of the present invention is a network node that aggregates multiple independent file systems and presents them to a network client as a single network file system, in which the content of a file presented to the client as a single file is distributed among multiple independent file servers.

Another aspect of the present invention is a network node that aggregates multiple independent file systems and presents them to the network clients as a single network file system by distributing individual files among said file systems based only on information available within said node at the time the distribution decision is made.

Another aspect of the present invention is a network node that aggregates multiple files residing on different independent file servers and presents them to a network client as a single file where the specific aggregation parameters are determined from rules and policies selected from a predefined set of rules and policies at the time the creation of the file is requested.

Another aspect of the present invention is a method for aggregating network file protocol transactions in a network system, the method comprising the steps of receiving a first frame of a first message belonging to a first transaction, the first frame containing a first file protocol header and a first data, the first transaction initiated by a first client computer; based on information in the first file protocol header, selecting a first set of file servers to participate in handling the first transaction; sending a second frame to a first server from the first set of file servers, the second frame containing a second file protocol header and a portion of the first data, the second file protocol header being derived from the first file protocol header.

Still another aspect of the present invention is a method for aggregating network file protocol transactions in a network system, the method comprising the steps of: receiving a first frame of a first message belonging to a first transaction, the first frame containing a first file protocol header and a first data, the first transaction initiated by a first client computer; based on information in the first file protocol header, selecting a first set of file servers to participate in handling the first transaction; sending a second frame to a first server from the first set of file servers, the second frame containing a second file protocol header and a portion of the first data, the second file protocol header being derived from the first file protocol header; receiving a third frame of the first message, the third frame containing a second data; sending a fourth frame to a second server from the first set of file servers, the fourth frame containing a third file protocol header and a portion of the second data.

Still another aspect of the invention is a method for aggregating network file protocol transactions in a network system, the method comprising the steps of: receiving a first frame belonging to a first transaction, the first frame containing a first file protocol header, the first transaction initiated by a first client computer, based on information in the first file protocol header, selecting a first set of file servers to participate in handling the first transaction, sending a second frame to a first server from the first set of file servers, the second frame containing a modified first file protocol header, sending a third frame to a second server from the first set of file servers, the second frame containing a modified first file protocol header, Yet another aspect of the present invention is a method for aggregating file systems by switching and aggregating network file protocol transactions.

Another aspect of the present invention is a method for aggregating file systems, the method comprising the steps of: aggregating the namespace of multiple file systems and presenting them as a single namespace; aggregating directories of multiple file systems by presenting them as a single directory; aggregating file objects of multiple file systems by presenting them as a single file object; aggregating the file data of files in multiple file systems by presenting it as data of a single file.

Still another aspect of the invention is a method for storing files in a network storage system, the method comprising the steps of aggregating the namespace of multiple file systems and presenting them as a single namespace; aggregating directories of multiple file systems by presenting them as a single directory; aggregating file objects of multiple file systems by presenting them as a single file object; and aggregating the file data of files in multiple file systems by presenting it as data of a single file.

Another aspect of the invention is a method for scaling switches that switch client-server protocols, the method comprising the steps of: implementing the switch so that it appears as a client to servers; implementing the switch so that it appears as a server to clients; and using the ability of servers to arbitrate between multiple clients in order to arbitrate between the switches.

Yet another aspect of the invention is a method for scaling a storage network functioning under a client-server network protocol, the network comprising clients and servers, the network protocol providing an ability of the servers to arbitrate requests from multiple concurrent clients, the servers implementing the server side of the network protocol, the clients implementing the clients side of the network protocol, the method comprising the steps of inserting a plurality of switches between the clients and the servers, each of the switches providing the server side of the network protocol when communicating with clients, and each of the switches providing the client side of the network protocol when interacting with servers; using the ability of servers to arbitrate between multiple concurrent clients in order to arbitrate between the switches.

Yet another aspect of the invention is, in a computer network that includes a plurality of client computers and a plurality of server computers, an apparatus for switching and aggregating files, the apparatus being interconnected among at least one of the plurality of client computers and at least one of the plurality of server computers, wherein the file switch computer: receives a message that includes data and a file protocol header in a first message frame; determines, in a manner based upon the file protocol header and independent of the message data, to which at least one network node the message is to be forwarded; derives a modified file protocol header in a manner based upon the determination; and forwards the modified file protocol header and the message data. In the alternative, when a plurality of concurrent messages are received by the file switch computer, only one of the concurrent messages can result in a successful request.

Another aspect of the invention is, in a computer network including a plurality of client computers and a plurality of server computers, an apparatus providing file switching and file aggregating functionality among at least one client computer and at least one server computer, the apparatus appearing as a client computer to the at least one server computer and as a server computer to the at least one client computer.

Another aspect of the invention is a switched file system for handling networked file data, the system comprising: a plurality of client computers; a plurality of server computers; at least one file switch, the file switch being capable of switching file messages from a client computer to a plurality of server computers.

Still another aspect of the invention is a switched file system for handling networked file data, the system comprising: a plurality of client computers; a plurality of server computers; at least one file switch, the file switch being capable of aggregating file messages from a plurality of servers to a client computer.

Another aspect of the invention is, in a computer network including a plurality of servers, a file switch, and a plurality of clients, a file directory created and maintained among the plurality of servers according to a process comprising: a first file switch receiving a file protocol message from a client, the message including a file header in a first packet of the message; the first file switch analyzing the file header; and the first file switch determining, according to a plurality of message handling rules, how to divide the message among the plurality of servers. In the alternative, the network can further include a plurality of switches, the message handling rules can be shared by a second file switch, or the plurality of message handling rules can be updated in the first and second file switch through file messages received from at least one file server.

Yet another aspect of the invention is an apparatus providing network use data, the apparatus comprising, in a computer network including a plurality of client computers and a plurality of server computers, an apparatus for aggregating files among the client computers and the server computers, the apparatus collecting the use data while switching file messages among client and server computers. In the alternative, a plurality of rules for aggregating files can be derived from the use data, or the apparatus can include a plurality of rules for aggregating files, and at least one change to the plurality of rules can be derived from the use data. In still another alternative, the at least one change can be reflected in a second aggregating apparatus in the network.

Another aspect of the invention provides, in a network including a plurality of file aggregators, each aggregator aggregating files according to a plurality of rules, a method for changing the rules within the plurality of file aggregators, the method comprising: changing the rules in a first aggregator; the first aggregator forwarding the rule changes to the remaining plurality of file aggregators; updating the rules in the remaining plurality of file aggregators.

Still another aspect of the invention is, in a computer network comprising a plurality of network participants, the participants comprising servers and clients, wherein file transactions flow among the network participants, an apparatus providing switching and aggregating of a single transaction among multiple network participants.

Yet another aspect of the invention is, in a computer network comprising a plurality of network nodes, the nodes exchanging transactions having headers, a network node that switches file protocol transactions among other network nodes in a manner based upon information contained within transaction headers.

Still another aspect of the invention is an apparatus for aggregating multiple servers in a network, the apparatus comprising means for aggregating network protocol transactions.

Yet another aspect of the invention is an apparatus for connecting a network client to a plurality of network servers, the apparatus comprising means for switching network file.

In addition, the following advantageous combinations of features and layouts of the inventive system are provided herein: an architecture including multiple file switches all identified under a single server name within a network; a method and system providing load balancing through a combination of a name resolution mechanism and a group controller mechanism; a method and system providing network function failover through a combination of a name resolution mechanism and a group controller mechanism; a network file system comprising a file switch and a plurality of file servers; a system, comprising a plurality of file switches and a plurality of file servers, in which the file switches synchronize access to the file servers using only synchronization mechanisms and protocol provided by the file servers; a switched file system in which a switch provides a caching function for either clients or servers; a switched file system in a network in which only commercially available software is required for member clients and servers to function; a switched file system administered as a single file server; a switched file system in which capacity and bandwidth can be scaled independently; a method and system providing opportunistic locking functionality and keeping a file open while maintaining a local copy of the file as cache in a gateway topology.

Still other advantageous applications of the invention include: usage tracking functionality, such as billing and Quality of Service (QoS); adaptive storage management; secure remote storage, enabling encryption and secure public storage applications; advanced storage capabilities such as triple mirror and online snapshots; journaling backup, requiring no backup window and reliable, step-by-step failure recovery; inexpensive global storage.

BRIEF DESCRIPTION OF THE DRAWINGS

The aforementioned features and advantages of the invention as well as additional features and advantages thereof will be more clearly understood hereinafter as a result of a detailed description of a preferred embodiment of the invention when taken in conjunction with the following drawings in which:

FIG. 13 illustrates data aggregation rules;

DETAILED DESCRIPTION

Figure 1:
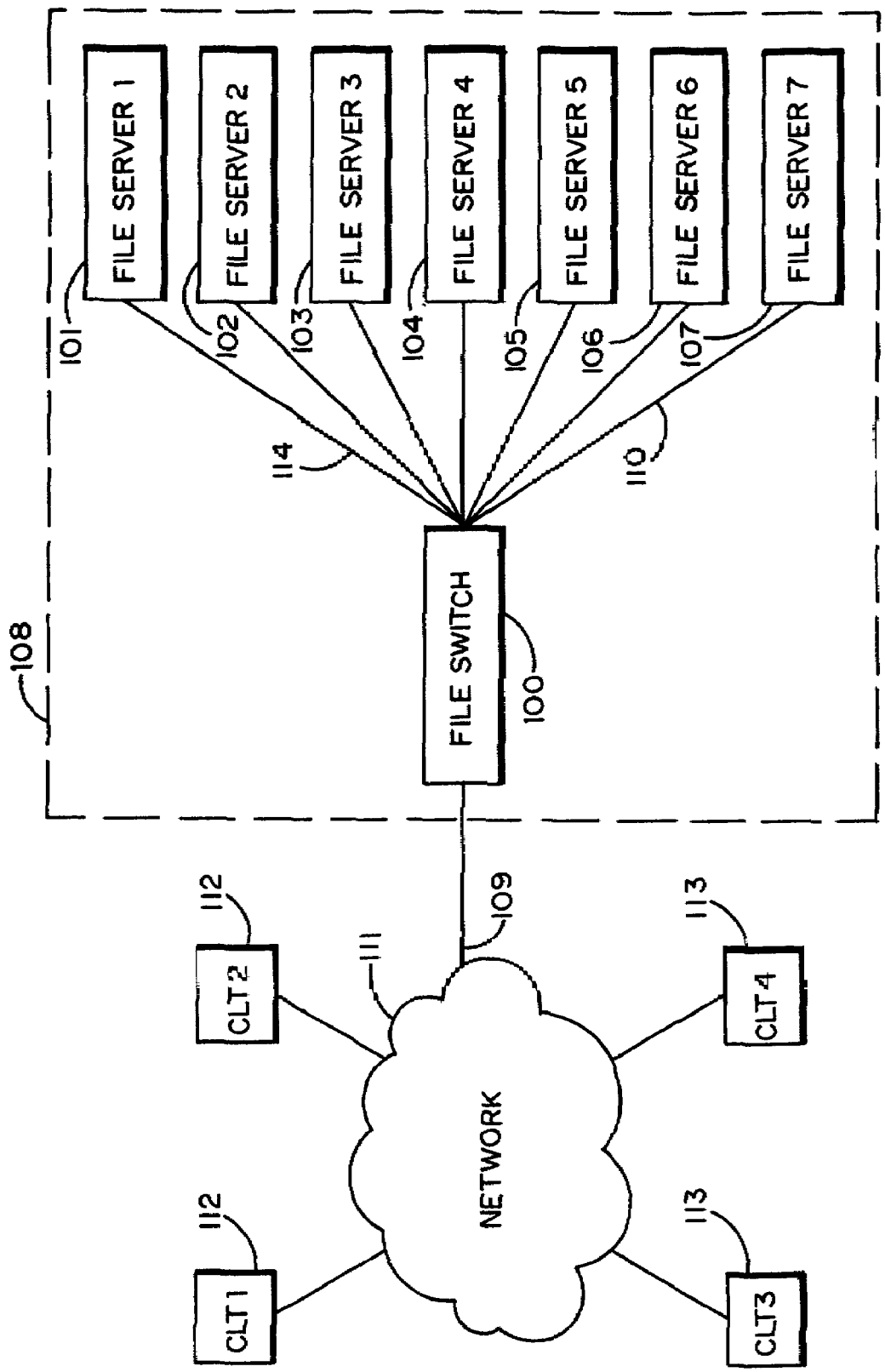
FIG. 1 illustrates a file switch in a computer network.

The following description is provided to enable any person skilled in the art to which the invention pertains make and use the invention and sets forth the best modes presently contemplated by the inventor for carrying out the invention. Various modifications, however, will remain readily apparent to those skilled in the art, since the basic principles of the present invention have been defined herein specifically to provide a file switch, a switched file system and their mechanisms of operation. Any and all such modifications, equivalents and alternatives are intended to fall within the spirit and scope of the presently claimed invention.

Introduction

In the background section, we identified three major problems with available systems that limit severely their scalability and manageability. The genesis of all three of these problems can be traced to the fact that, without exception, available systems are based on the client-server architecture. Despite varying topologies, in all of these systems clients interact directly with servers during actual file access. As a result, any specialized functionality required by available systems must be implemented either on the client side or on the server side. In most systems, this results in proprietary software being required on both client and server sides of the system, causing numerous maintenance and adoption problems.

Moreover, because the available system includes many clients and many servers, the system requires special functionality to arbitrate the interactions between them, specifically in handling metadata, directories and locking. Such functionality ends up residing on a separate server or requiring tight coupling between a group of servers, as is the case with clustering; in both cases, arbitration becomes a major bottleneck and limits the scalability of the system.

The present invention eliminates all of the above problems by implementing a three-tiered architecture instead of the traditional client-server model. In this architecture, which we call a switched file system, an intermediate node, called a file switch, is introduced into the system between the network file clients and the network file servers.

The introduction of a file switch into the system allows us to decouple clients and servers, thereby eliminating the one-to-one connections between them. As a result, clients are no longer aware which particular server handles a given file or even whether the file is handled by a single server or is distributed among multiple servers. This has major impact on the architecture and capabilities of the system.

First, it makes it possible to aggregate the storage capacity of multiple servers in a manner transparent to clients. Second, it makes it possible to aggregate the performance of those servers by both distributing files among them and by striping individual files onto a plurality of servers that can perform in parallel. Third, it makes it possible to mirror individual files synchronously on multiple servers thereby increasing the availability of the data, again transparently to the clients. Fourth, by effectively aggregating the file servers in the system into a single virtual network file system, the file switch greatly simplifies the management of the whole system to the point where it can be managed almost as easily as a single file server can.

Moreover, since in a switched file system, the clients are effectively isolated from the particular process in which files, directories and data are distributed among file servers, it is possible to change that process at any time while the switched file system is operating. This is extremely important,. since it constitutes a foundation for building adaptive, self-tuning network file systems that are capable of tracking the usage patterns and adjusting the distribution of data to optimize storage, performance and access.

Finally, the file switch can operate using standard network file and other protocols that are already supported on both clients and servers. This fact has profound practical advantages in commercial systems, making it possible to use a wide range of already available file servers, NAS appliances and clients to build a new generation of highly scalable, available and easy-to-manage file systems.

File Switch

A file switch is a computing device with at least one network interface, at least one CPU and memory. The hardware architecture of the file switch is preferably optimized for handling high volumes of network traffic with minimal latencies. The switch is preferably equipped with multiple high-speed network interfaces, such as gigabit or higher Ethernet interfaces.

Since most popular network file protocols are based on the IP standard, the file switch preferably supports TCP and UDP IP network protocols, as well as other protocols of the IP stack (e.g., ARP), as appropriate. The file switch preferably supports multiple industry standard network file protocols, such as NFS and CIFS.

FIG. 1 illustrates an inventive network configuration including a file switch. In this configuration, the file switch 100 is implemented with two different network interfaces: one for connecting to the client network 111 through connection 109, and the other for connecting to a file server network through connections 110, 114 and other similar connections as shown. For simplicity, the file switch is illustrated connected directly to each of the file servers 101 through 107; in practice, one or more commonly available layer 2 switches are preferably used to implement these connections.

Clients, such as PCs or workstations 112, and application servers 113 request file services by communicating to the file switch 100 using the NFS or CIFS protocols. Switch 100 preferably implements the server side of the appropriate network file protocol on the connection 109. The switch further interacts with the file servers 101 through 107 by implementing the client side of preferably the same network file protocol. The presence of file switch 100 is thereby preferably transparent to both the clients and the servers.

Additionally, the file switch may implement other IP protocols, such as DHCP, DNS or WINS, either as a client or as a server for purposes such as discovering and configuring file servers 101 through 107, self-configuration of the switch, and others such as will be described herein.

The fact that the file switch implements industry standard protocols both on the client side 109 and on the server side 110 and 114, allows it to function in an environment where the file servers 101 through 107 are standard, commercially available file servers or NAS appliances, and clients 112 and 113 are standard commercially available computers. In this manner, the benefits of the file switch can be utilized without requiring any proprietary software to be installed and maintained on any other network node.

The primary functionality of the file switch can be divided into three broad categories: transaction handling (incl. transaction switching and transaction aggregation), file system aggregation (incl. aggregating file system objects and file data), and switch aggregation which includes various mechanisms for combining multiple file switches together (incl., load balancing, configuration sharing, failover and management aggregation).

The functionality of the file switch may be implemented in software, in hardware or any combination of software and hardware, as appropriate.

Transaction Handling

The typical operation of the file switch involves receiving file protocol requests, such as login, tree connect/mount, file open, file read/write, etc., from clients 112 and 113 and forwarding, or switching these requests to one or more of the file servers 101 through 107.

Figure 2:
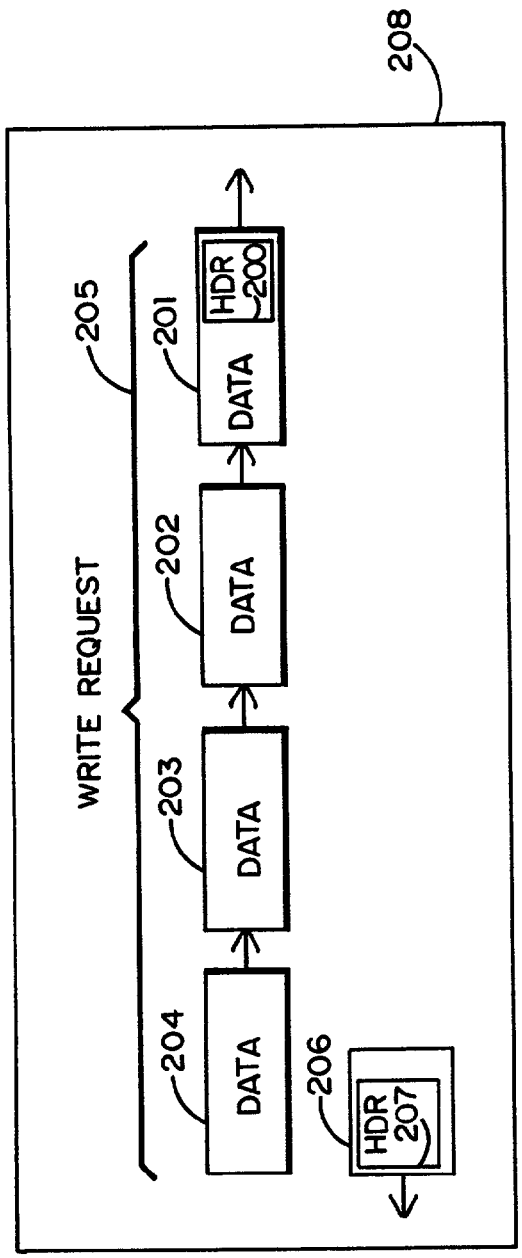
FIG. 2 illustrates a transaction in a network file protocol.

Network file protocols are typically based on transactions. FIG. 2 illustrates a typical file write transaction in a network file protocol. The transaction 208 consists of two messages: a write request 205 and a write response 206. The write request 205 consists of multiple network frames 201 through 204 and includes a header 200 located in the beginning of the first network frame 201, which header specifies the various parameters of the request, such as file handle, offset, etc.; and the user data, often called payload, which is to be written to the file. In our example, the payload spans the multiple frames 201 through 204.

The transaction 208 typically proceeds as follows: a client is connected to a server through a protocol such as TCP and uses that connection to issue the request 205 by sending the protocol header 200 and the payload. The TCP protocol stack divides the request into multiple network frames 201 through 204, prefixes each of them with address information and transmits them in sequence to the server.

The TCP protocol stack on the server receives frames 201 through 204 as they arrive. The server waits until it has received the whole message 205 and then interprets the contents of the header 200, and executes the required operation, in this case a file write, by writing the data payload to the proper file. Upon completion, the server forms a response header 207 indicating the results of the requested operation and submits it to its local TCP protocol stack for transmission to the client. In response, the TCP protocol stack forms a network frame 206 containing the header 207 and sends it to the client. The client receives the header 207 and checks the result of the transaction. The transaction is now completed.

Message Switching

Unlike an available file server, the inventive file switch is an intermediate node with respect to most file protocol transactions. This means that the switch does not handle those transactions internally but, instead, examines the requests such as 205, optionally modifies request headers such as 200, and forwards the message to a file server. Because of this, the file switch preferably does not wait to receive all frames of a message such as 205 before forwarding it to the server. This allows the file switch to avoid introducing unacceptable latency on multi-frame file protocol transactions, such as 208.

Figure 3:
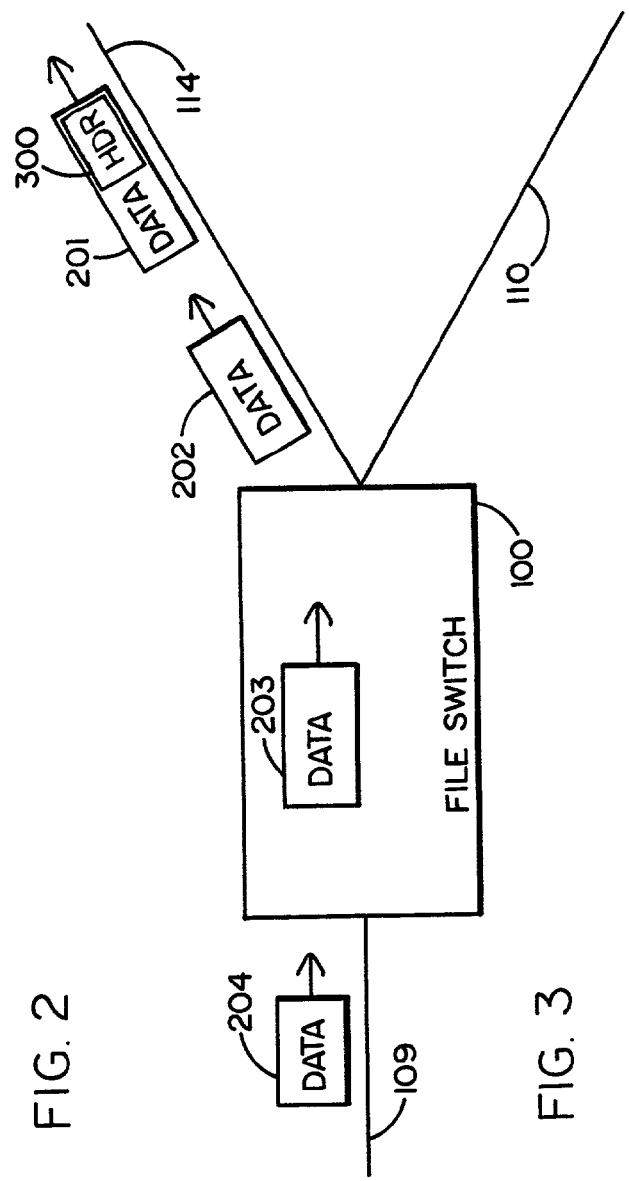
FIG. 3 illustrates message switching in a file switch.

FIG. 3 illustrates a way in which the file switch handles multi-frame transaction messages such as the write request 205. Upon receipt of the first frame 201, which contains the request header 200, the switch 100 recognizes that this frame signifies the beginning of a new message, examines the header 200 and decides to which of the file servers to forward the whole message. The file switch then replaces the header 200 with the new header 300 containing modified request information as expected by the target file server and forwards the frame 201 with header 300 to the chosen file server.

The remaining frames 202 through 204 from the message 205 continue to arrive at the switch one by one. As each frame such as 203 arrives, the switch recognizes the fact that this frame belongs to the message 205 and uses the decision made while processing frame 201 to forward it. The process of forwarding may require modifying lower-level protocol headers traveling with the frame with the appropriate address and other information.

Since most of the work of the switch is related to the making of the forwarding decision and happens only once per message, when the first frame 201 is received, the remaining frames of the message can be easily handled at wire speed and at the same time as the file server is receiving previous frames, thereby avoiding large latencies.

Transaction Switching

Figure 4:
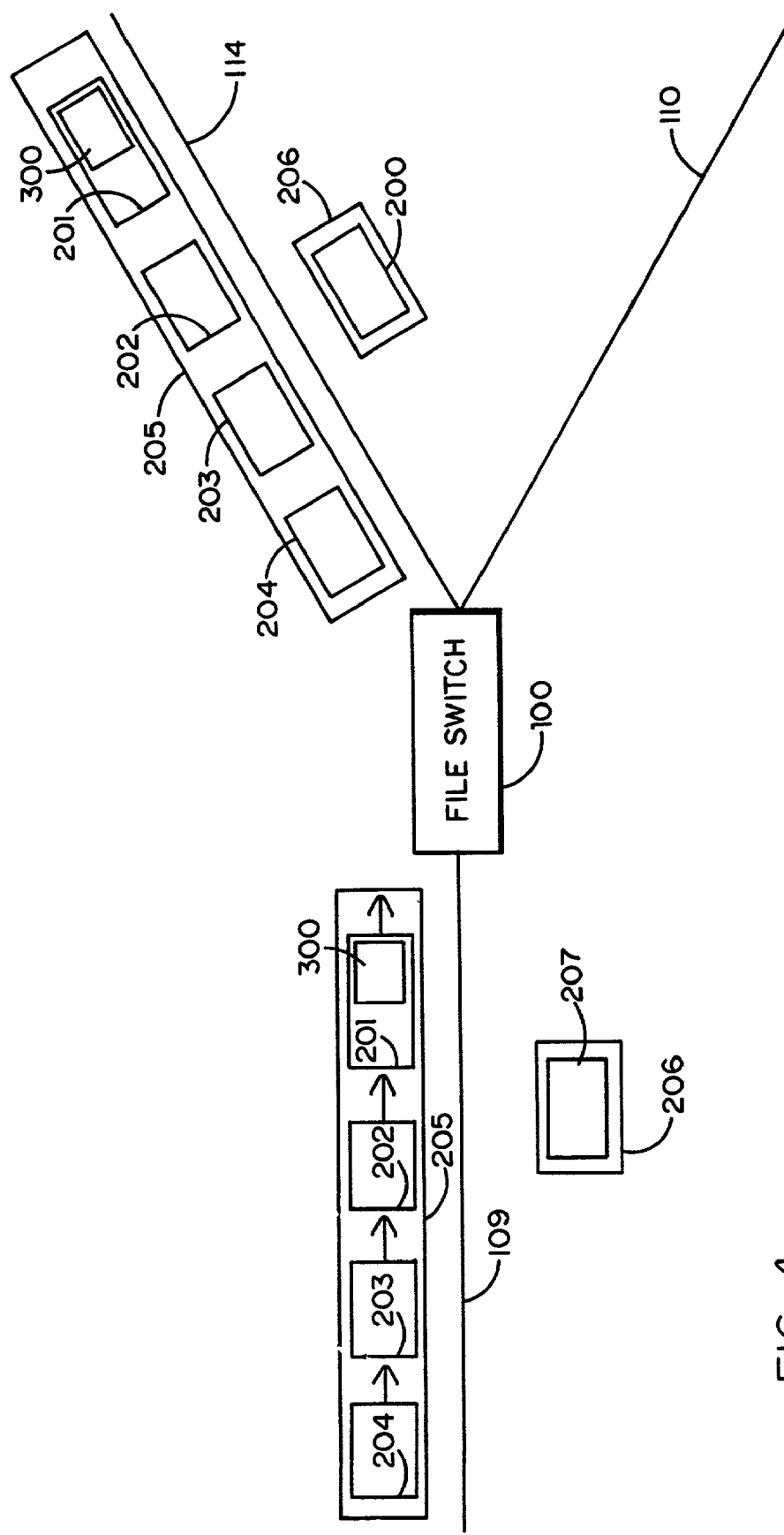
FIG. 4 illustrates transaction switching by a file switch.

FIG. 4 illustrates the preferred way in which the file switch switches a complete file protocol transaction within the environment illustrated in FIG. 1. A client (not shown) is connected to the file switch 100, preferably through TCP, and in fact views the file switch 100 as a file server. The client initiates a write transaction by issuing a request message 205 addressed to the file switch. Upon receipt of the first frame 201 of this message, the file switch has all information identifying the request, the file handle to which it pertains, and all other parameters of the request except for the payload.

The switch is now in a position to decide which file server has the appropriate file and therefore should be handling the client's request. In our example, the switch determines that the file server on the right side of connection 114 (not shown) is the correct file server. The switch has previously established a connection to that file server, and in fact the server believes that the switch is a bona-fide client. The switch now determines how to modify the parameters of the request so that the file server can successfully execute the request. The switch then updates its state in a manner sufficient to handle the rest of the transaction as described herein, and forwards frame 201 with a modified header 300 to the file server through connection 114 and proceeds to switch the rest of the request message as described above.

Upon receipt of the complete request 205, the file server executes the action that the client connected through connection 109 originally requested from the file switch, forms a transaction response 206 containing response header 400, and sends the response back to the file switch 100 which the file server believes to be the originator of the request 205.

The file switch receives the transaction response 206 and recognizes that it belongs to the same transaction as the previously switched request 205. The switch then examines the transaction reply header 400 and determines how to modify that header so that the client on connection 109 would accept the modified result as a valid response to the original request 205.

Finally, the switch transmits the modified response 206 with the modified header 207 to the original client. The client receives the response and believes that the switch 100 has served the request 205 for it by executing the requested file system operation.

The mechanism described herein allows the file switch to delegate file protocol transactions to one or more of the file servers connected to it in a manner transparent to the clients. A limitation of this inventive mechanism is that, although it allows the switch to direct different transactions coming from the same client to different file servers, each individual transaction can only be delegated to a single file server.

Transaction Aggregation

Figure 5:
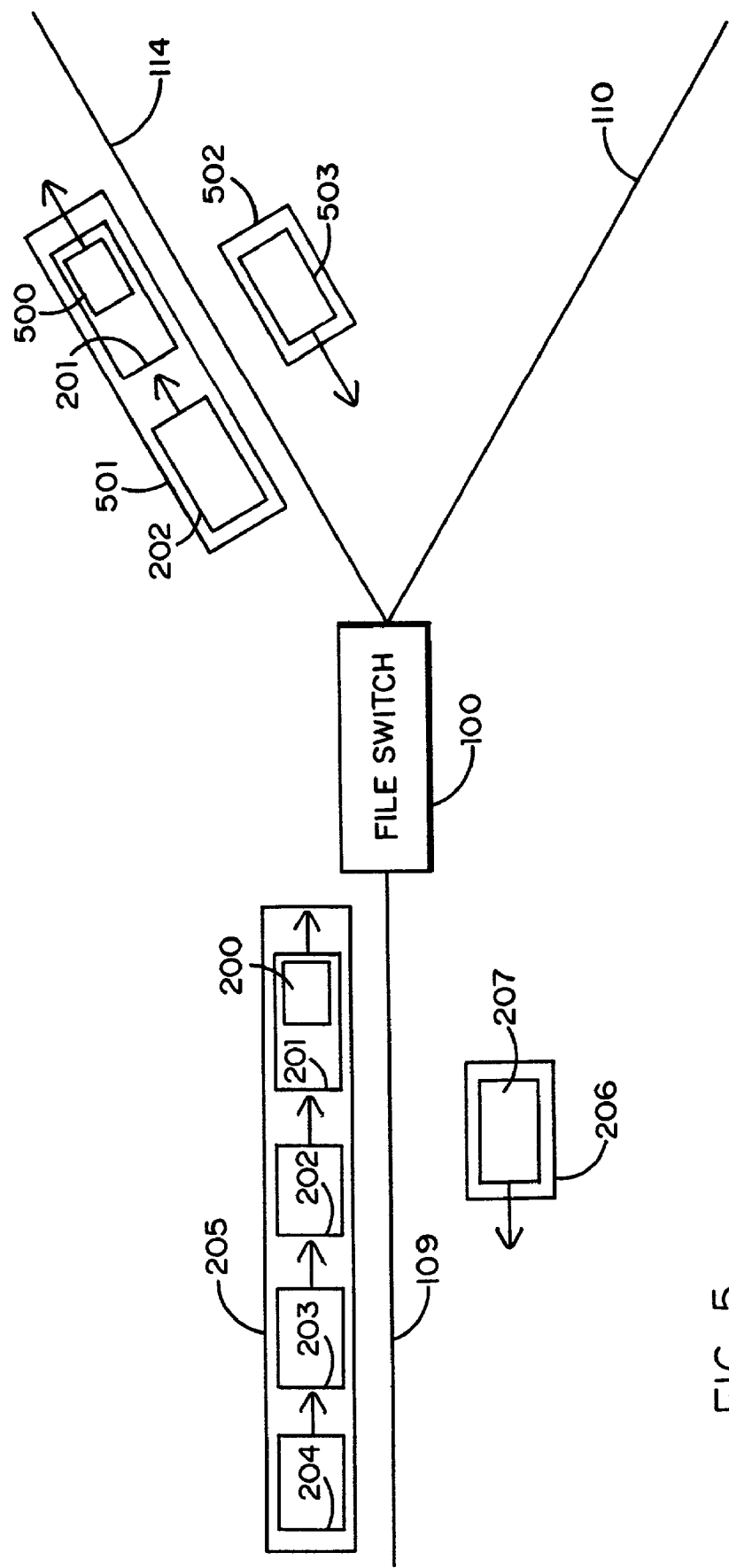
FIG. 5 illustrates transaction aggregation by a file switch.

FIG. 5 illustrates the preferred process by which a file switch can delegate a single transaction received from a client to more than one file server and therefore aggregate the behavior of those servers in handling the transaction, presented to the original client as the result of the behavior of a single file server.

Consider the case in which the switch 100 stripes the data of a file among file server 101, connected to the switch through connection 114, and file server 107, connected to the switch through connection 110, in order to deliver higher aggregate performance to clients by making these two file servers handle requests in parallel.

As in the example in FIG. 4, a client is connected to switch 100 through connection 109, has established preferably a TCP connection to the switch, and believes the switch to be a file server. The client, therefore, initiates a file write transaction by issuing request message 205 to the switch. As in the previous example, the switch receives the first frame 201 of message 205 and is in a position to decide how to handle the transaction.

Unlike the previous example, the switch handles the transaction by splitting it into two transactions targeted to two separate file servers (such as 101 and 107 in FIG. 23). Upon examining the request header 200, the switch updates its state in a manner sufficient to accomplish the goal, replaces the header 200 with a modified header 500 and forwards the frame 201 to the file server 101. Upon receipt of frame 202, the switch forwards that frame to the same server 101, effectively creating a new request 501 to that server which carries only a portion of the data payload of the original client request 205.

Upon receipt of the next frame 203, the switch forms a new request header 504, inserts it into frame 203 and forwards that frame to the file server 107. Upon receipt of the last frame of the original request 204, the switch forwards it to the file server 107 as well, effectively creating a new request 505 to that server, which request carries the remainder of the data payload of the original client request 205.

The two file servers 101 and 107 have now received separate file write request, each for its appropriate file and each with the appropriate portion of the data to be written. The servers now execute the requested write operations in parallel and submit their respective responses 502 and 506 to the switch, which switch they believe to be the originator of the requests 501 and 505. It should be noted that this inventive process does not require in any way that servers 101 and 107 interact with one another or even be aware of the other's existence.

Upon receipt of responses 502 and 506 from file servers 101 and 107, respectively, file switch 100 knows the results of both write requests submitted by it and is, therefore, in a position to form a response 206 to the original client containing the aggregate result of the transaction. The switch achieves this by forming a response header 207 using the data contained in headers 503 and 507 and sending header 207 to the original client in frame 206. The client receives the response 206 containing the result of its original request 205. The transaction is now complete.

The mechanism described above enables two innovative results. First, the file switch can aggregate a set of file system entities, such as files or directories that reside on different file servers and present this set to the clients as a single cohesive entity, thereby forming the foundation for aggregating complete file systems.

Second, this mechanism allows the switch to split or replicate individual read and write network file transactions among multiple file servers, which can execute the requested operations in parallel. In this manner, the present invention sets the foundation for forming the equivalent of a parallel file system on a network including file switches and file servers, with the ability to deliver aggregate performance to each client that is many times higher than the performance of the individual file servers available to it.

Those skilled in the art to which the invention pertains will easily recognize that the operation of the mechanism described herein may also require that it may be advantageous to split a network frame to which a header is added, such as 202, into multiple frames, each carrying a portion of the data. Such frame splits, joins and other reassembly may be required in other places for optimal operation of the file switch and do not in any way change the logic of operation of the present invention.

It should be noted that derivation of the header may comprise any of the following: modifying the path or filename that is in the header; changing the identification information, such as the connection ID or the file handle (TID and FID fields as defined in the CIFS protocol, respectively), so that the other side find the identification info it expects (the file switch will give one file handle to the client, while it will receive multiple different handles, one per member file); changing the length of the payload (e.g., when striping, a portion of the payload may go to one server, the rest to another; so the switch will need to inform each of the servers that the switch will be reading/writing only the respective portion).

Moreover, where two frames are aggregated, derivation of the header may further involve: adding up the number of bytes read/written by each of the servers that responded, and sending back to the client the sum thereof (because the switch will send all the data received from the servers); aggregating the status (this technique may also be used in concurrency handling and non-data transactions, described elsewhere herein): determining the status the file switch needs to send to the client in a manner based upon the status returned by each of the servers.

Aggregating Network File Systems

One objective of the file switch is to aggregate file system services provided by conventional file servers and present them to network clients as a single, large, very high performance network file system, the availability of which is many times higher than the availability of each individual file server.

To achieve this objective, the file switch preferably aggregates all operations of one or more network file protocols in such a way that clients connected to the switch will not be able to distinguish its operation from the operation of a single network file server. This requires the switch to aggregate all entities exposed by a typical network file protocol, in particular, the file system namespace, directories, file objects and the data contained in files.

Rule-based Aggregation

The mechanisms that the file switch uses to achieve file system aggregation are preferably implemented such that they can be driven from a set of rules and policies defined on the switch.

There are several reasons that make rule-based aggregation desirable. First, it allows a storage administrator to specify different ways of aggregation for different sets and/or types of files, thereby easily tuning the characteristics of the system to the intended use and the specific access patterns for different data. Second, it allows the file switch to operate with more deterministic timing by eliminating the need to consult external devices during normal operation.

In addition, rule-based operation allows multiple file switches to aggregate and be put in front of the same set of servers without the switches having to interact with each other except to synchronize the set of rules and policies whenever it changes. This loose coupling between switches that aggregate the same set of file servers makes it possible to scale access bandwidth by orders of magnitude, simply by adding switches whenever needed.

Finally, since file switches are in an excellent position to track usage patterns internally, they can adjust the aggregation rules automatically in accordance with policies specified by the system administrator and observed usage patterns. As a result, the file switch can optimize in wide margins the distribution of files and data among the servers it aggregates to achieve smooth and adaptive behavior of the network storage system as a whole.

Namespace Aggregation

The inventive file switch can be configured to aggregate multiple file servers under a common file system namespace.

Figure 6:
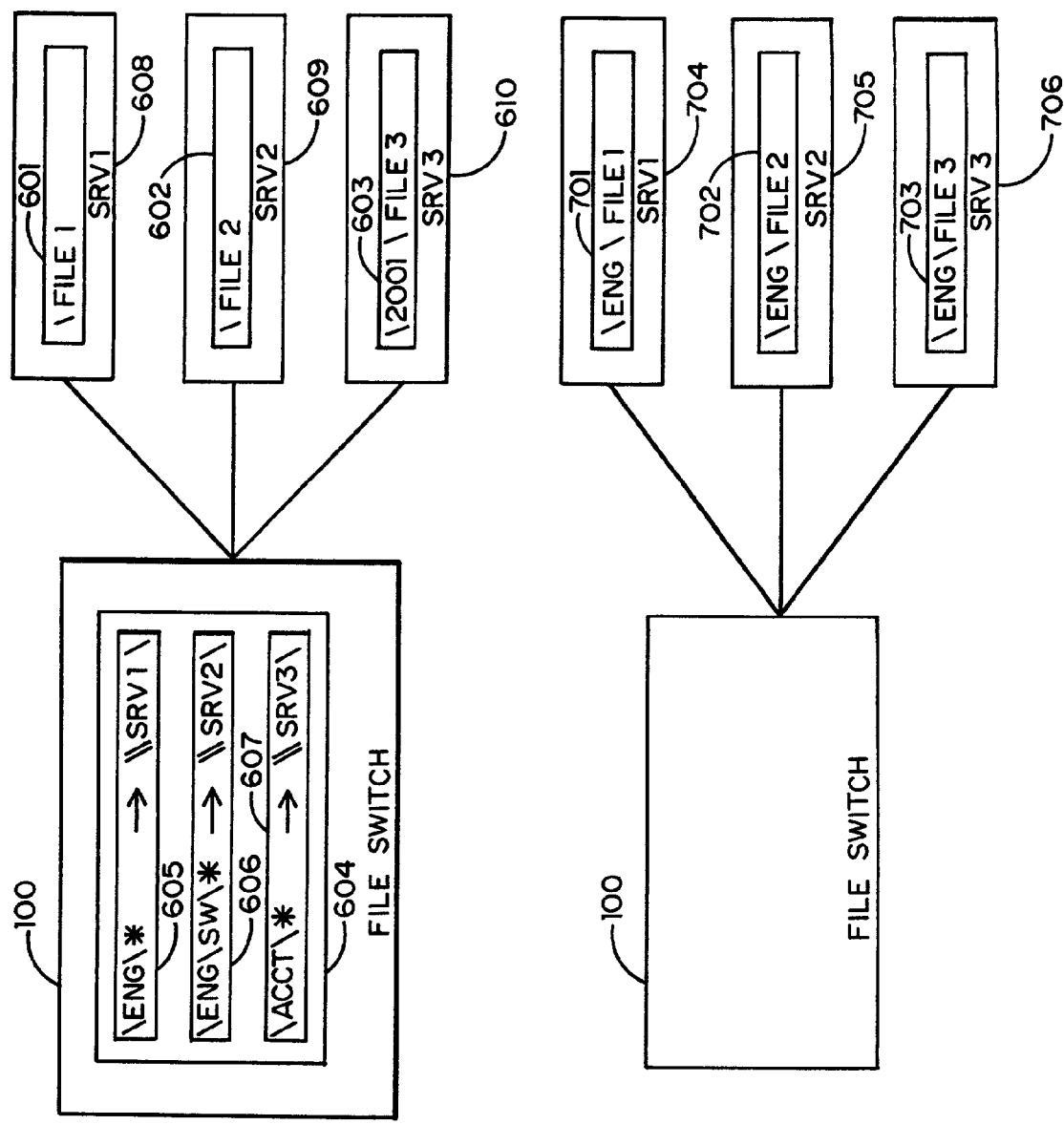
FIG. 6 illustrates namespace aggregation by a file switch.

FIG. 6 illustrates rule-based namespace aggregation by the inventive file switch. The rules for namespace aggregation are preferably defined as a table of path correspondences. The first column specifies the names visible to the clients, the second column specifies the name of the server and, optionally a share or a mount point on that server, in which the files actually reside. File switch 100 is connected to three file servers 608, 609 and 610. Loaded within (or otherwise accessible by) the file switch is rule table 604 that specifies three rules 605, 606 and 607. The path names 601, 602 and 603 of incoming file requests, such as file open, initiated by a network client are compared to the name-mapping rules in the first column (preferably the comparison is done longest matching prefix first, so that overlapping pathnames can be specified). If a match is found, the matching portion of the file base path is replaced with the name from the second column and the request is forwarded to the new path for processing. Once a file is open on the target server, all further transactions related to this file are switched to that server.

For example, rule 605 specifies that the \ENG subtree of the common namespace is to be mapped to the server 608. File 601 will match this rule and therefore will be switched to the server 608 where it will arrive with a modified path. However, rule 606 specifies that a subtree within the \ENG subtree, namely \ENG\SW, is to be mapped to a different server, server 609. File 602 satisfies this rule and will therefore be switched to server 609, where it will arrive with a modified path. In addition, rule 607 specifies that the \ACCT subtree is to be mapped to server 610. This rule will drive the switching of file 603 even though this file resides in a subdirectory of the \ACCT subtree (because of the prefix match).

In addition to base path, other namespace mapping rules are contemplated. For example, a rule may specify that all files with a given extension (and, optionally also under a given subtree) are switched to a specific server. For example, a rule (*.mpeg→\\srv3\dir6) will cause all MPEG files to be sent to the subdirectory dir6 on server 610, no matter where in the logical namespace these files reside.

Note that the mapping is configured and performed on the file switch. The clients don't need to know, and in fact have no way of knowing, the mapping and do not need to be reconfigured if the mapping is changed.

By aggregating the namespace of multiple file servers into a common namespace, the file switch achieves a function similar to what available distributed file systems do without requiring any proprietary client-side software.

Directory Aggregation

Namespace aggregation as described in the previous section is an easy way to distribute files among different servers, and also to add a new server to an existing system. However, this technique alone may not be sufficient to aggregate seamlessly the storage capacity of multiple file servers. For example, with namespace aggregation alone it may not be possible to tell how much free disk space is available on the aggregated file system.

Since different directories are mapped to different servers, a file that may not be possible to store under the \ENG subtree for lack of room may be successfully stored under the \ENG\SW subtree, which resides on a different server. Thus, even when the system as a whole has plenty of available storage space, particular file operations in particular places in the namespace may not be able to execute successfully without extensive human intervention.

Directory aggregation resolves the above issues by making it possible to distribute files that reside in the same aggregated directory among different servers. This ensures that the files from all directories of the combined namespace can share all of the available free disk space.

Figure 7:
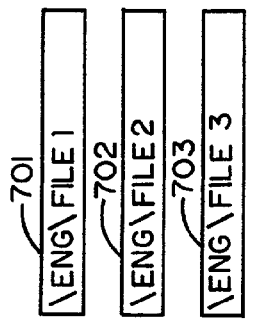
FIG. 7 illustrates directory aggregation by a file switch.

FIG. 7 illustrates directory aggregation by a file switch. The switch 100 is connected to three file servers, 704, 705 and 706 and is configured to aggregate directories on those servers. When a transaction to create a new file is initiated by a client, the switch decides on which of the servers to create the specific file, and then switches the transaction and all other transactions related to this file to that server. Whenever a request to open an existing file is initiated by a client, the switch determines on which of the servers the file resides and switches that transaction and all other transactions related to this file to the appropriate server. In our example, the file 701 ends up on server 704; the file 702, which resides in the same directory ENG as file 701, ends up on server 705; and the file 703, which also resides in that same directory, ends up on server 706.

The directory aggregation mechanism described herein assumes that any directory on which it operates exists on all servers. One way to ensure this is to have the file switch create any intermediate directories whenever a first request to create a file in a given directory on that server is received; another way to ensure this same result is to have the switch replicate directories (but not files) among all servers. Yet another way to achieve the same result is to have the switch aggregate directory create transactions to all servers, ensuring that whenever a client requests that a directory be created it is created on all servers simultaneously. One skilled in the art can easily recognize other ways to achieve the same result.

Whenever a client initiates a transaction to enumerate the files in an aggregated directory, the file switch aggregates that transaction, effectively causing the corresponding member directories on the different relevant file servers to be enumerated in parallel. The switch then concatenates the results of the enumeration, eliminates duplicate names (such as subdirectories that exist in multiple places) and submits the results back to the client.

An important part of the mechanism described herein is the specific way in which the switch chooses the target file server for each file that resides in the aggregated directory. One inventive technique that can achieve this result is as follows: when a new file is to be created, the file switch selects the target file server either randomly or based on the amount of disk space available on that server and switches the file create transaction to that server. When a transaction to open an existing file is initiated, the file switch aggregates the transaction by submitting open requests for this file to all servers in parallel, and selecting the server which succeeds in opening the file.

Another way to achieve the same result is to select the file server based on a computational algorithm, such as hashing, that uses information available within the file open and file create requests. For example, a hashing algorithm can be used to select a server from a finite set based on the name of the file, which name will always be unique. This method has an advantage of operating the same way when creating new files and when opening existing files, and not creating unnecessary load on the servers when submitting file open requests.

Yet another possible mechanism is described below.

Directory aggregation may be performed for part of the file system, as defined by namespace aggregation. For example, the following rule:

\\zx\marketing\art\*>\\srv1\dir1 (A)
    \\srv2\dir2 (N)
    \\srv3\dir3 (N)
    \\srv4\dir4 (N)

specifies that files under the marketing\art directory will be stored on \\srv1 first. When \\srv1 fills up, new files will be stored on \\srv2. When it fills up, new files will be stored on \\srv3, and so on. When \\srv3 fills up, the administrator can add more file servers.

A possible implementation of this mechanism is to maintain state data for each file server included in the rule. The possible states are: filled-up (F), active (A) and new (N).

In this example, only one server is in the active state at any given time (\\srv1 in the table above). New files are created on that server. When the active server fills up (preferably within 10% of capacity), that server is moved to filled-up state and another server is moved from new to active state. When the administrator adds a new, empty server, it is put in the new state.

The file switch makes the state transitions automatically. After some time, the above rule may look as follows:

\\zx\marketing\art\*>\\srv1\dir1 (F)
    \\srv2\dir2 (F)
    \\srv3\dir3 (A)
    \\srv4\dir4 (N)

When a file open request arrives, the file switch may first try to open the file on the currently active device (because recently created files are likely to be accessed more frequently). If the file is not there, it can submit the open request to all servers (in parallel) to find an older file. The file will reside only on one of the devices; the switch will forward further operations with this file to that device.

Those skilled in the relevant art will recognize that numerous other mechanisms can be utilized to achieve unambiguous selection of a target file server in directory aggregation.

File Aggregation

In order to be able to stripe and/or mirror the contents of a file among multiple file servers, the file switch has to be able to aggregate multiple files residing on different servers and present them to the client as a single file. This section describes how the file switch aggregates file objects, as opposed to how it aggregates the data residing inside the files. Data aggregation is covered elsewhere herein.

Figure 8:
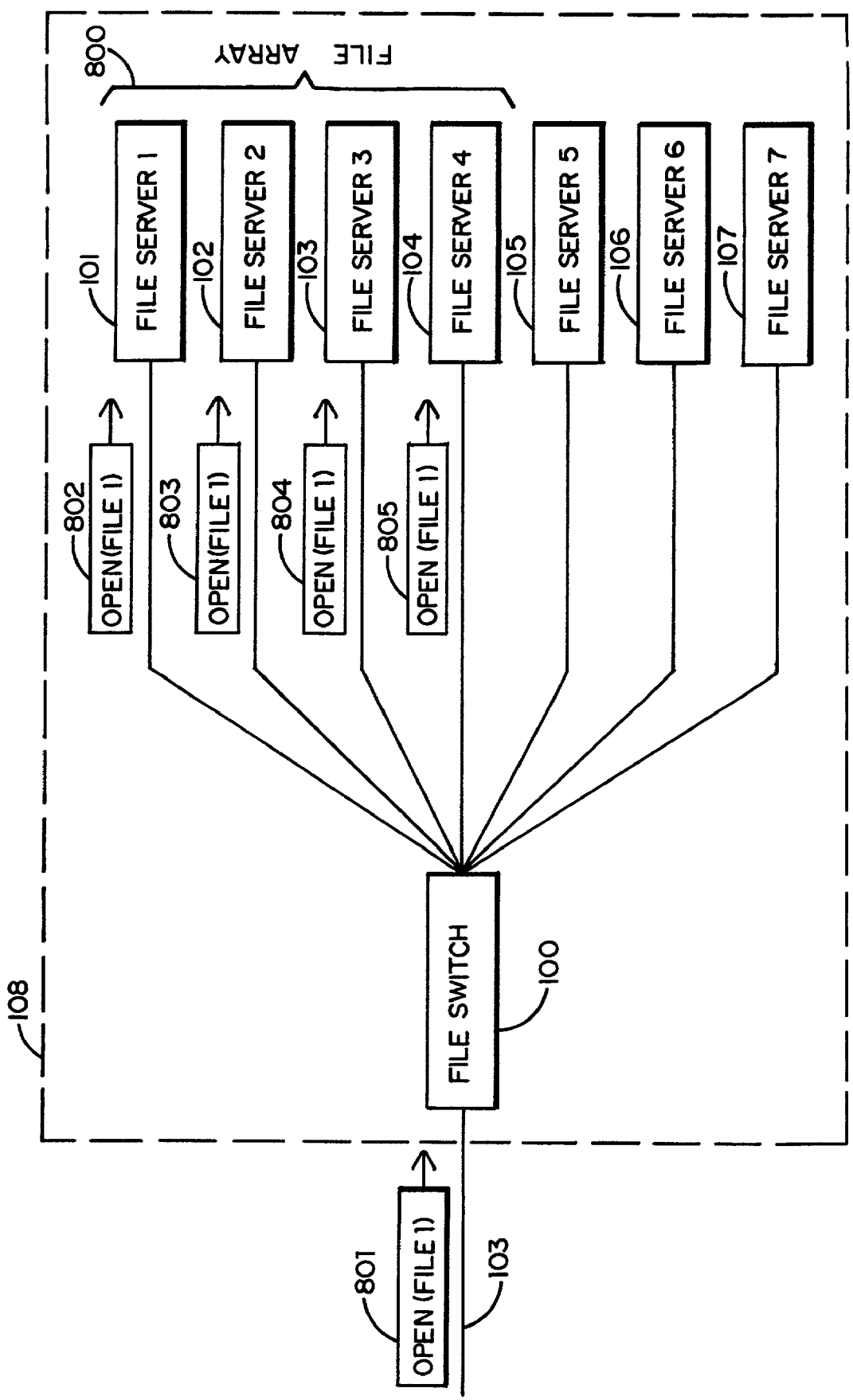
FIG. 8 illustrates file object aggregation by a file switch.

FIG. 8 illustrates the inventive technique of file object aggregation by a file switch. File switch 100 receives a file open request 801 from a client connected through connection 109. The switch determines the subset of file servers on which instances of the aggregated file are to reside; in this example, servers 101, 102, 103 and 104, collectively identified as the file array 800. The switch then submits appropriately modified file open requests 802, 803, 804 and 805 to servers of the file array 800, in parallel. The servers 101 through 104 receive their respective file open requests 802 through 805, execute them in parallel and respond according to protocol back to the switch, each believing that the switch is its client for the individual file that resides on that server. The switch collects all responses from the file servers, updates its state with information regarding the member files that comprise the aggregated file, each residing on one of the servers 101 through 104 of the file array 800, aggregates the transaction result and submits it back to the original client.

As a result, the client can now initiate various file transactions on the file (in this example, FILE1), as if it were a real file residing on a single file server. The switch aggregates different transactions differently. Its operation on the read and write transactions is described elsewhere herein. The operation of the file switch with respect to concurrency-related requests and issues is described in the following section.

In most commercial file systems, file objects are named entities that have a rich set of attributes, such as creation date, last modification date, size, disk usage, access control lists (ACL), security descriptors, backup/archive indicators, and even user-defined properties. To properly aggregate the file object, the file switch has to apply different ways of aggregation to the different attributes. For this reason, the inventive technique for aggregation of the file object will be described generally without limiting the description to a specific file system and implementation of a network file protocol, from which description one of ordinary skill will be able to apply the description to a specific network file protocol.

In general, the preferred way of handling attribute-related transactions in the file switch is to apply any requested modifications of attributes to all files in the set of member files that comprises the aggregated file, and read the values of those attributes from as few of the member files as possible when requested. The actual way in which specific attributes are aggregated varies depending on the semantics of the particular attribute.

For example, the creation date of the aggregate may be the creation date of the first stored instance of this file; the last modification date may be the latest date/time on which at least one of the instances of the file has been modified. The algorithm for determining the aggregate file size is preferably based on how the file is being striped and/or mirrored; for example, for a file that is striped but not mirrored, the file size can be defined as the sum of the sizes of all member files; for a file that is both striped and mirrored, the file size can be defined as the sum of only the member files from a single mirror image. As a further example, the disk usage for such file can be defined as the sum of the disk usage attribute of all stripe and mirror member files.

One skilled in the art can recognize that these and other file attributes can be aggregated in many different, unambiguous ways, all of which may work well in the inventive file switch.

Aggregation of Concurrency Mechanisms

Since file servers and network file protocols are designed to be accessed by multiple clients simultaneously, they typically provide excellent support for concurrency handling. For example, the CIFS network file protocol provides the ability to request an exclusive file open, meaning that if two clients request open at the same time, only one of the requests is going to succeed.

In the case of a single file server, this support is often implemented inside the file server by using operating system synchronization objects. This works well for a single server in which access from multiple clients can be serialized within the same computer. However, as the background discussion explains, extending this approach to multiple servers in a clustered configuration creates a bottleneck. For this reason, the present invention preferably uses a different mechanism for handling concurrency.

Figure 19:
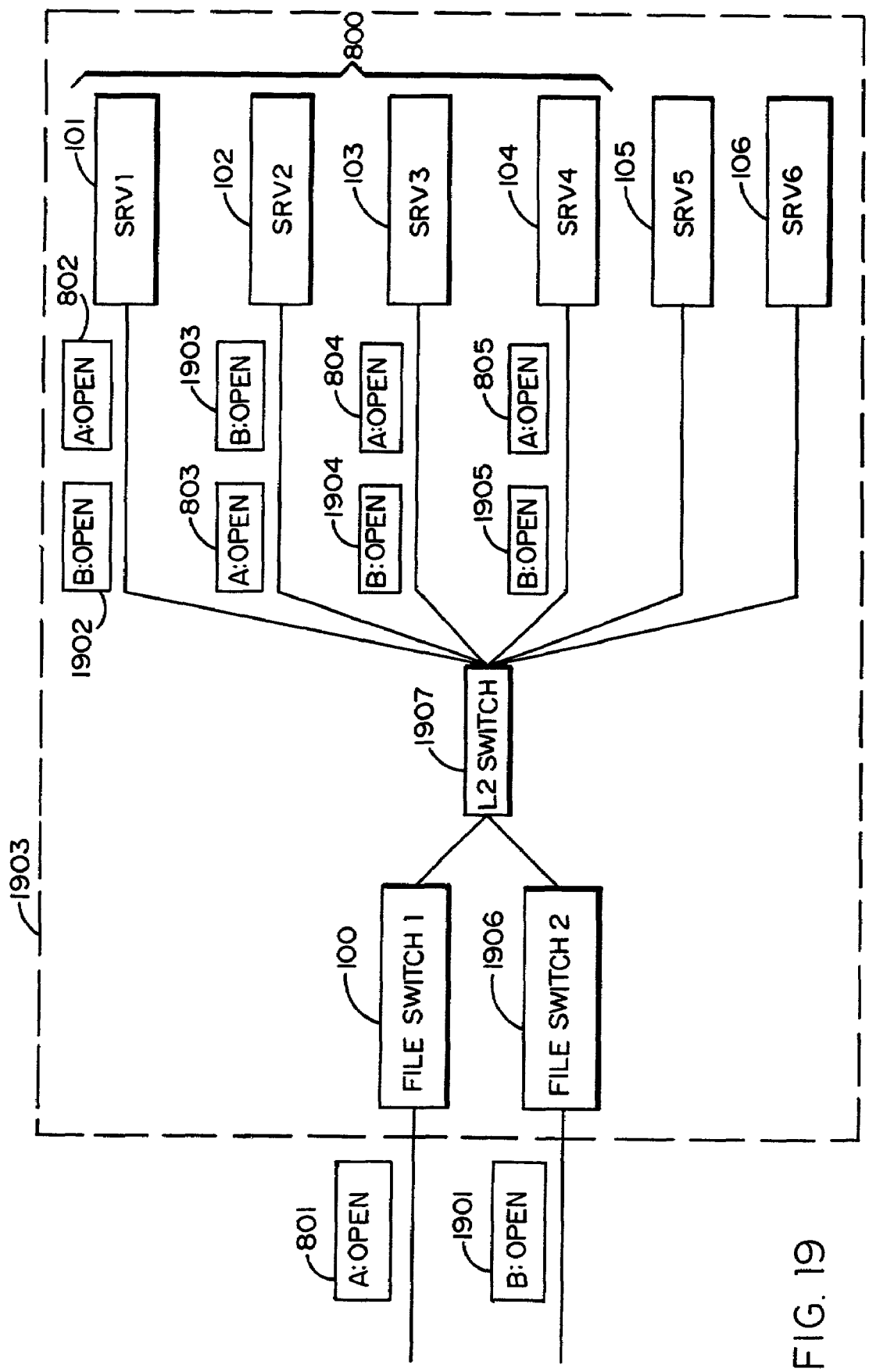
FIG. 19 illustrates concurrent access in an aggregated file system.

Concurrency Problem; An Example:

FIG. 19 illustrates concurrent access in an inventive aggregated file system. The system 1908 consists of two file switches 100 and 1906, file servers 101 through 106, and a layer 2 switch 1907, which is used to connect the file servers and the file switches.

In this example, two clients send requests for an exclusive file open simultaneously. A first client, client A is connected to file switch 100 and sends its exclusive file open request 801 to it; a second client, client B is connected to the file switch 1906 and sends its exclusive file open request 1901 to it. In this example, the requested file is aggregated from four files, each residing on one of the servers 101 through 104 (the four servers forming the file array 800 for this file).

Both file switches process the request at the same time and try to process it by switching the incoming requests 801 and 1901 to each of the four servers of the file array 800. File switch 100 sends requests 802 through 805 to the file servers 101 through 104, respectively. File switch 1906 sends requests 1902 through 1905 to the file servers 101 through 104, respectively. While the two switches may have issued the requests at the same time, the requests arrive at each of the file servers in some order. In this example, the file servers 101, 103 and 104 receives the requests 802, 804 and 805, respectively, before they receive the corresponding requests from the file switch 1906, namely the requests 1902, 1904 and 1905. The file server 102 receives the request 1903 from the file switch 1906 before it receives the request 803 from the file switch 100. One skilled in the art will easily recognize that other orders are apparent, as well as similar situations with more than two clients, more than two switches and another number of file servers.

Based on the above-described order of arrival of requests, the file servers 101, 103 and 104 satisfy the open requests 802, 804 and 805 coming from file switch 100 and refuse the requests 1902, 1904 and 1905 from the file switch 1906. The file server 102 satisfies the request 1903 from the file switch 1906 and refuses the request 803 from the file switch 100. As a result, from the standpoint of a file switch, both aggregated transactions will fail, since neither of them would succeed in opening all four of the member files, and will fail the respective client requests 801 and 1901. This scenario is clearly in violation of the semantics of the exclusive open request, which semantics state that one client should succeed and all others should fail.

One skilled in the art will recognize that this situation is a classic deadlock problem, in which although the resource for which the clients compete (i.e., the aggregated file) is available and can be granted to one of the clients easily, none of the clients is able to acquire it (i.e., open the file).

Algorithm for Handling Concurrent Access

The present invention achieves in such cases a proper semantic behavior of aggregated network file protocol transactions, such as 801, with respect to other network file protocol transactions, such as 1901, that target the same aggregated file. It does this by aggregating in a deterministic way the results of each of the transactions so that only one of the multiple concurrent transactions attempted on the same file or other file system entity may succeed.

Figure 9:
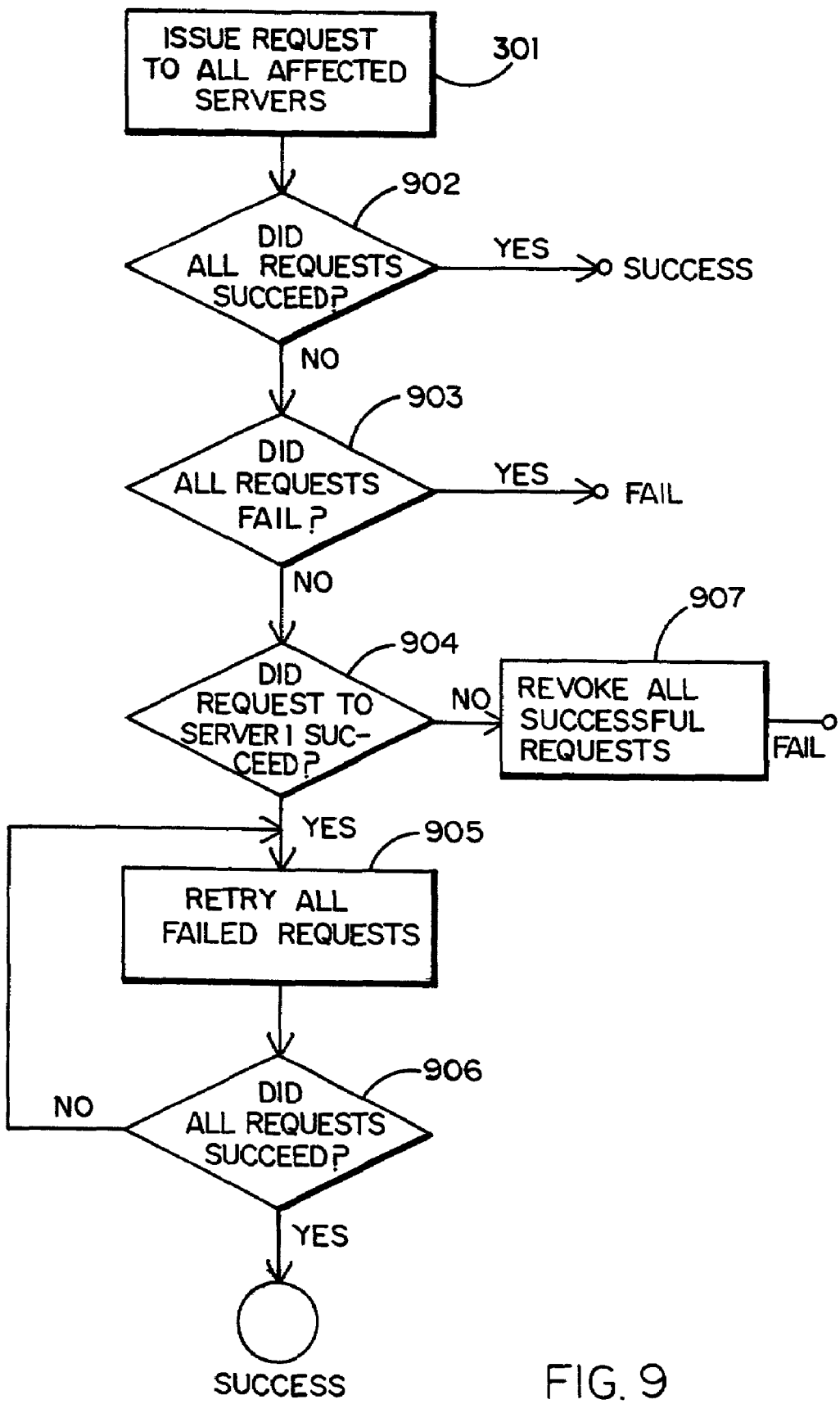
FIG. 9 illustrates a method for handling concurrency in file aggregation.

FIG. 9 illustrates an algorithm for achieving this result. In the first step 901 of the algorithm, the file switch issues the requests of the aggregated transaction to all target servers and collects their responses. In step 902, the switch checks whether all responses indicate success; if yes, the algorithm completes successfully (e.g., the file is open successfully).

If at least one of the responses indicates failure, the algorithm proceeds to step 903 in which the file switch checks if all of the responses have failed; if yes, the algorithm completes with the file switch failing the aggregated transaction (i.e., the file cannot be opened at this time). If at least one of the responses indicates success (i.e., the switch was able to open the file successfully on at least one of the target servers), the algorithm proceeds to step 904. In this step the switch checks whether the result of the transaction of the first server (in our example, server 101) indicates success. If no, the switch proceeds to step 907, in which it revokes all member transactions that have succeeded (i.e., closes member files) and fails the aggregated transaction.

If step 904 takes the YES branch (i.e., the switch has successfully opened the member file on the first server 101), then the algorithm proceeds to step 905 and 906, in which the switch retries all failed member transactions, until they all succeed, at which point it completes the aggregated transaction successfully.

When applied on all of the concurrent transactions, the algorithm illustrated in FIG. 9 guarantees that one of these transactions will succeed and all others will fail, therefore achieving the proper atomic behavior. Note that each of the file switches can decide whether to retry or revoke the transaction based on the results that it received from that transaction, without information about the specific results received by transactions targeting the same file from other switches. One skilled in the art will easily recognize that this algorithm extends to any number of switches and any number of clients. Additionally, a single file switch can preferably use the same algorithm to arbitrate competing requests from two of its own clients, thus avoiding the need for other internal synchronization with respect to this type of operation.

The present invention thus defines one possible mechanism for supporting concurrency in an aggregated file system by the following steps and mechanisms:

1. Switching the incoming transactions as described herein;
2. Using the concurrency resolution mechanisms provided by the network file protocols implemented in each of the file servers
3. Providing an algorithm, such as illustrated in FIG. 9, that is capable of producing a deterministic reaction for all the competing transactions (i.e., only one of the competing transaction succeeds) while each switch takes action based on such algorithm and the results of its own transaction, without requiring the results from the other competing transactions.

One skilled in the art will easily recognize that this aspect of the invention is easily adaptable to any number of file switches, including that a single file switch can use the same in order to ensure the proper handling of competing requests from clients connected to that same switch. In addition, one skilled in the art will easily recognize that algorithms other than the algorithm illustrated in FIG. 9 can be used to achieve this result, while remaining in the spirit of the present invention.

Implicit Locking

Network file protocols typically provide file-level locking and byte-range locking in order to synchronize multiple clients that try to write to the same file and the same area within a file. When locking is used consistently by all clients, there is no need for additional synchronization in order to avoid inconsistent data being written to different mirrors of the same file; however, not all file client applications use the locking mechanism consistently.

A mechanism that further ensures consistency of the file data written to multiple file servers by multiple file clients simultaneously, and ensure that all mirror copies of the same file contain the same data is the following. When the file switch receives a file write request, it checks if the requesting client has acquired either a full file lock (exclusive writer or an exclusive oplock) or a byte-range lock for the requested region. If not, the file switch issues a byte-range lock for the region of the file which the client requested to write to, then performs the write operation, then unlocks the region and completes the file write transaction to the client.

When this mechanism is consistently used by the file switch, and in the case of multiple file switches accessing the same set of file servers by all file switches, it ensures consistency of the file data at a level comparable to that maintained by any single file server.

Reservation Files

Yet another mechanism, frequently deployed in conjunction with network protocols that don't support locking, is to create a "reservation" file on a file server. With this mechanism, if two or more clients try to perform a desired transaction on a given file A (such that should be executed by only one client at a time), each client will first try to create a "reservation" file with a well known name and location (e.g., file LOCK in the same directory as file A). They attempt to create the reservation file using a file create request with exclusive semantics, i.e., a request that will have succeeded if it created the file and fail if the file already existed.

So, if both clients try to execute the desired transaction, each will first try to create the reservation file. One of the clients will succeed and will proceed with the desired transaction. The other client will fail to create the reservation file, because it already exists, and will not execute the desired transaction. Instead, it periodically tries to create the reservation file; as long as the reservation file exists, these attempts will fail. When the first client completes the desired transaction, it will delete the reservation file. Then the next attempt of the other client to create the reservation file will succeed, and then proceed with the desired transaction.

The file switch can use the same mechanism of creating reservation files when it is necessary to execute an operation that cannot be easily backed out using only the algorithm illustrated in FIG. 9. Note that the lock file can be created in the same directory where the member files reside, and have a file name that is a derivative of the file targeted by the competing transactions. This way, there is no centralized "locking" or synchronizing authority, as the synchronization is distributed among the multiple file servers.

One skilled in the art will easily recognize that the reservation files mechanism is a further development of the algorithm provided in FIG. 9, in keeping within the spirit of the invention, and that other modifications and extensions of that algorithm can be advantageously used with the file switch.

Aggregation of Opportunistic Locks ("Oplocks")

Another mechanism frequently deployed with network protocols is opportunistic locks (oplocks; also known as callbacks). Since oplocks allow client-side caching (while preserving data integrity, consistency and timeliness), using oplocks typically increases the performance experienced by clients.

The file switch preferably aggregates oplocks for the member files and provides oplocking for the aggregated file it presents to the clients. To do this, the file switch requests an oplock for each of the member files; if all oplocks are granted (i.e., the file switch holds oplocks for all member files), the file switch grants the oplock to the client. If one of the member file servers breaks the oplock it granted to the file switch, the file switch breaks the oplock it granted to the client. (If the client had not requested an oplock, then the switch can simply note in its state that it no longer holds an oplock for the specific file, so it will reject subsequent client's requests for such oplock.) The switch then preferably waits for the client to acknowledge that it has completed all actions required to break the oplock (such as writing back and discarding any cached data for this file) and acknowledges the oplock break completion to the file server that first broke the oplock. The manner in which the file switch responds to the oplock break request from a server is preferably the same as the way the client responded to the switch (e.g., oplock broken OK or file closed).

If, while the client is processing the oplock break request from the switch, another file server attempts to break the oplock it granted for the same file, the file switch retains in memory that this happened. When the client completes the oplock break, the switch responds to all servers that requested that the oplock they granted be broken. The file switch notes in its state that an oplock for this file is no longer granted; if other file servers try to break the oplock on the same file, the file switch can immediately acknowledge the oplock break, since its client no longer holds the oplock (and, consequently should not have cached any data or range locks).

As will be clear to those skilled in the relevant art, the above-described mechanism can be used to handle the various types of oplocks defined by network file protocols, as well as to fully break or only downgrade oplocks (such as a downgrade request from exclusive to level II oplock in the CIFS protocol).

One skilled in the art will also recognize that this mechanism further enables the simultaneous operation of multiple file switches with the same set of file servers.

Summary of Aggregation of Concurrency Mechanisms

One skilled in the art will recognize that other algorithms may be employed to achieve the same results and ensure consistent and atomic behavior for aggregated transactions. Similarly, one skilled in the art will easily recognize that the same approaches may be applied to other file transaction types, such as locking, creation, etc.

In effect, the present invention aggregates the existing synchronization mechanisms provided by network file protocols to implement synchronization between the clients of multiple independent file switches without requiring direct interaction and communication, and therefore, coupling, between the file switches themselves. In addition, each individual file switch can further use these mechanisms in order to synchronize transactions requested by multiple clients that are connected to that switch.

Data Aggregation

The ability to aggregate file objects among multiple servers and do so safely in a concurrent environment enables the file switch to distribute the data of the aggregated file on multiple servers, thereby achieving both parallel operation and high availability. The same process can be viewed as the file switch aggregating the contents of the member files into a single file that it presents to its network clients.

Most network file protocols represent file data as contiguous arrays of bytes. This means that the techniques required to distribute the data for each individual file are not different from the techniques required to distribute the data for an array of hard disks. One skilled in the art will recognize that all methods for doing so, as described in the background art section, including striping, mirroring and all other variations of RAID, can be inventively applied to distributing data of individual files as well.

Figure 10:
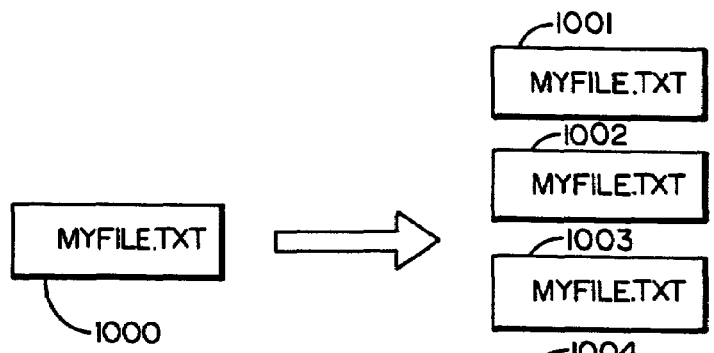
FIG. 10 illustrates data aggregation through mirroring.
Figure 11:
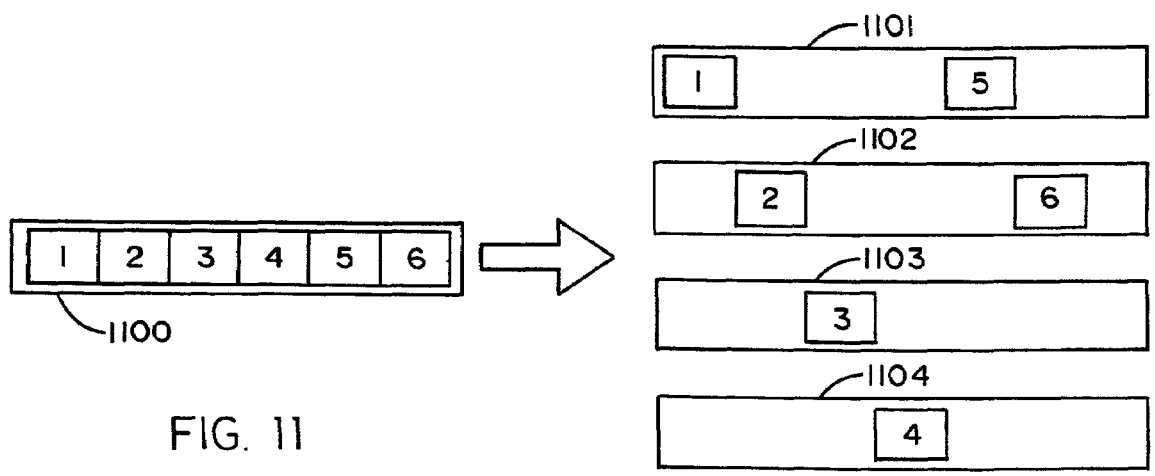
FIG. 11 illustrates data aggregation through striping.
Figure 12:
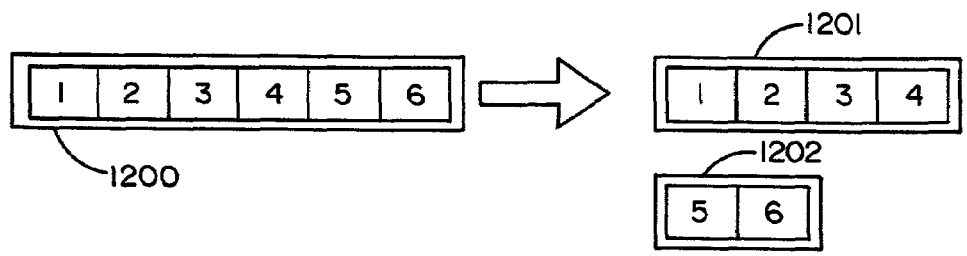
FIG. 12 illustrates data aggregation through spillover.

FIGS. 10-12, described hereinafter, respectively illustrate mirroring, striping, and spillover as implemented by the present invention. As these mechanisms exist conventionally, a representation of the clients and servers is not believed necessary. It is noted, however, that these mechanisms are performed by the present invention based on switching file protocol transactions that take place in the file switch (represented by the arrow in each of these figures), rather than API functions that take place on a local machine, typically the client.

Mirroring

FIG. 10 illustrates data aggregation through mirroring in a switched file system. In this example, the file switch (not shown) aggregates member files 1001, 1002, 1003 and 1004, all preferably residing on different file servers, into a single aggregated file 1000, presented to the clients. The member files 1001 through 1004 contain identical data, which the switch presents as contents of the aggregated file 1000.

When the client initiates a file open transaction, the switch aggregates that transaction (as shown in FIG. 8) and preferably opens all member files 1001 through 1004. When the client initiates a file read transaction, the file switch selects, preferably randomly, one of the file servers on which the member files resides and switches the read transaction to it. That server executes the read transaction and returns the response to the switch; the switch forwards the response to the client, thus completing the read transaction requested by the client. With this mechanism, if multiple clients try to read the same file 1000, the switch will direct their transactions to different member servers at random. The switch thus balances the load among these file servers; in addition, the clients can experience up to four times (in this example) increase in performance compared to a situation where the file 1000 is stored on a single server.

When a client initiates a file write transaction, the switch aggregates the transaction by replicating the user data into all of the member transactions. As a result, all member files 1001 through 1004 are updated synchronously with the same data. Since all member transactions execute in parallel, this does not significantly degrade the performance of the aggregated file on write comparing to a file stored on a single server.

Finally, when a client initiates a close transaction, the switch aggregates it in a manner similar to the open transaction and closes all member files.

One other significant advantage of file mirroring is that the above transactions can be completed successfully even if one or more of the member file servers become unavailable. Open, write and close transactions will be switched to all available servers; read transactions will be switched to any one of the available servers. This way, as long as at least one of the member files is online, the file system as a whole and the aggregated file 1000 in particular remain available to all clients.

Striping

FIG. 11 illustrates data aggregation in a switched file system through striping by a file switch. In this example, the file switch (not shown) aggregates member files 1101, 1102, 1103 and 1104, all preferably residing on different file servers, into a single aggregated file 1100, presented to the clients. The member files 1101 through 1104 in this case contain different, non-overlapping stripes, which the switch presents as a contiguous aggregated file 1100.

When the client initiates a file open transaction, the switch aggregates that transaction (as shown in FIG. 8) and opens the member files 1101 through 1104. When the client initiates a file read transaction, the switch aggregates this transaction by executing the following steps. First, determining based on the stripe size and the requested starting offset and the requested transaction size, which of the member servers will be involved in the transaction, and at what starting offset and what amount of data each of them must read. The switch then issues the member transactions to the selected servers and aggregates the results by ensuring that data arrives at the client in the right reconstructed order. The client receives the aggregated header for the response, followed by all of the data requested, in the correct order.

One skilled in the art will recognize that the write transaction in this case is executed in a manner similar to the read transaction described above, except that the data is distributed as illustrated in FIG. 5 instead of being assembled as was the case with the read transaction.

Finally, when a client initiates a close transaction, the switch aggregates it in a manner similar to the open transaction and closes all member files.

In the case of data aggregation through striping both read and write transactions are aggregated by submitting corresponding read and write transactions for smaller amounts of data to multiple member servers in parallel. This results in a respective increase of performance, which the file switch can deliver to each individual client, as well as to an excellent load balancing in the case of multiple clients accessing the same file. In addition, as multiple studies have shown, striping tends to resolve the problem of hotspotting.

Spillover

FIG. 12 illustrates data aggregation through spillover. The spillover mechanism is preferably used to aggregate storage capacity, preferably in conjunction with one or more of the other mechanisms described herein. The spillover is especially useful in cases where one or more of the member servers for an aggregated file unexpectedly run out of disk space while the file is open. The figure illustrates an aggregated file 1200, comprising two member files 1201 and 1202, preferably residing on different file servers. As seen from the figure, sections 1, 2, 3, and 4 of the aggregated file 1200 reside in member file 1201, while the remaining sections 5 and 6 reside in member file 1202.

Spillover happens when the file switch, in the process of writing data into a file unexpectedly discovers that the target file server is about to run or has run out of disk space. In such case, rather than failing the write transaction, the switch may elect to open a new member file on another server and continue writing into it. The contents of the two files are concatenated to present a common contiguous byte array in an obvious way. One skilled in the art will recognize that the spillover mechanism can be applied to the second file as well, creating an arbitrarily long chain of member files, so that all disk capacity in the system can be fully utilized if needed.

The file switch switches file transactions to spilled-over files as follows. For open and close transactions, it preferably switches the transaction to all servers on which member files (i.e. containing any portions of the data of file 1200), so that all member files are opened or closed, respectively. For read and write transactions, the file switch looks at the starting offset and the length of the payload to be read/written and switches the transactions as follows:

(a) if the payload fits completely within the first member file (e.g., segments 1 and 2 from file 1200), the file switch switches the transaction to the first server.

(b) if the payload fits completely within one of the spillover (second and further) member files (e.g., segment 5 from file 1200, which is stored in the beginning of the member file 1202), the file switch switches the transaction to the server on which that member file resides. The switch also modifies the parameters of the transaction by subtracting from the starting offset for the transaction the starting offset of the member file within the aggregated file. In our example, segment 5 is at offset 0 in file 1202, so 4 segments should be subtracted from the request, resulting in a request to read the first segment from file 1202.

(c) if the payload spans multiple member files (e.g., segments 4 and 5 from file 1200), the file switch replicates the transaction to all servers on which portions of the request reside, modifying the starting offset and length of each transaction. Upon receiving the responses, the file switch reconstructs the data in the correct order (similar to the way this is done for striping) and sends it back to the client.

In order for the spillover mechanism to function, the file switch preferably has to be able to tell, after opening the member file 1201 that (a) a member file 1202 exists, (b) the target server on which the file 1202 resides, and (c) whether there are any other member files in the spillover chain for this file. One way to accomplish this is through using extra metadata stored with each of the member files. With this approach, the file switch reserves a small, fixed size data block in the beginning of each and every member file upon file creation and makes that block invisible to clients. When a file needs to spill over, this metadata block can be used to store the name and the server on which the next member file resides, as well as the total number of the files in the spillover chain.

If the above mechanism is implemented, the same metadata block can be used to optimize access to striped and mirrored sets of member files by storing information that will help the switch locate members more conveniently.

Alternatively, if the underlying member file servers support other mechanisms for associating custom data with files (e.g., streams or extended attributes), the metadata block can be stored using one of those mechanisms instead.

For the purpose of the above description, file metadata can be defined as a data structure containing information about how the contents of a given file is stored on the file servers. For example, the data structure can include the number of spillover segments, the size of each segment and the identification (such as name) of the file server on which each segment resides. As another example, the data structure may also contain the aggregation parameters used for aggregating the given file, such as number of stripes, stripe size, number of mirrors, etc.

Summary of Data Aggregation

One skilled in the art will easily recognize that the mechanisms described in this section can be beneficially applied simultaneously to the same file. For example, mirroring and striping can be combined to increase both performance and availability of a single file; further, spillover can be added to the same file in case some of the file servers run out of storage space. Moreover, one skilled in the art will recognize that other data aggregation techniques, for example RAID4 and RAID5, can be implemented in a file switch in addition to or instead of the mechanisms described herein.

Failure of a File Server

The ability to keep the contents of a file distributed and/or replicated to multiple file servers allows the present invention to provide high availability of the data in case of a failure of a file server.

The failure is discovered by (a) a file server not responding to a heartbeat that the file switch periodically sends to the server, (b) a file server connection dropped, or (c) an operation requested by the file switch from the file server times out. Preferably, the switch discovering the failure can notify any other switches connected to the same file server that the particular server is no longer available and no requests should be sent to it.

As long as all files stored in the set of file servers have at least one mirror copy, there is no loss of the stored file data. All file switches simply start reading the file using its mirror copy. Operation continues, with possibly degraded performance and with degraded redundancy until the file server is restored. If M is the number of mirror copies configured in the rules by the administrator, up to M-1 file servers can fail with no loss of file data.

When a previously failed file server is restored to operational state and returned to the set of servers, the file switch initiates a file system synchronization on it; once the file system on the new server is fully synchronized with the rest of the servers, the file server resumes normal operation.

The synchronization may be complete (starting from a newly initialized file system) or incremental (starting from the previous state—based on file dates and sizes). The synchronization is performed without making the file system unavailable to clients; the load that the synchronization process puts on the file servers and the switch may be configurable by the administrator so that the network file system remains sufficiently available to clients.

Aggregation Rules

One advantage of the present invention comes from the fact that the file switch aggregates file data on a file-per-file basis, such that different files can be aggregated in different ways using different combinations of striping, mirroring and other data aggregation techniques to achieve optimal balance between performance, storage utilization and the desired level of data availability.

It is well known that the effectiveness of striping, mirroring and other data aggregation techniques when applied to block devices, such as in RAID or parallel file systems, can be greatly diminished by the fact that no single solution can fit all types of files and access patterns. By way of example, streaming video can be striped very effectively over a large number of devices, since streaming data is usually being read in large segments. On the opposite side of the spectrum, HTML files are typically only a few kilobytes large and not a good target for striping.

The present invention utilizes aggregation rules to configure the file switch with different data aggregation parameters for different types and/or sets of files.

FIG. 13 illustrates the syntax of data aggregation rules and provides examples of such rules. The preferred syntax 1300 defines a set of aggregation parameters, namely, number of mirrors, number of stripes and stripe size, which are selected for a given set of files based on each file's path (location in the aggregated namespace) and type (recognized by the file extension/suffix).

Rule 1301 shows typical parameters for MPEG files located anywhere in the file system. The rule is selected for any file path and only for files whose filename extension is MPEG, and it defines mirroring by 2, striping by 32 and a stripe size of 16 KB. With this rule, any MPEG file will be mirrored once (two copies of the data will exist in the system) and striped across 32 file servers, with a file stripe of 16 kilobytes.

Rule 1302 shows typical parameters for HTML files located anywhere in the file system. The rule is selected for any file path and only for files whose filename extension is HTML, and it defines mirroring by 64 and no striping. With this rule, any HTML file will be mirrored on 64 file servers which allows load balancing when read by large number of clients simultaneously (which is the typical access pattern for HTML files on a HTTP server).

Rule 1303 shows typical parameters for Microsoft Word document files located anywhere in the file system. The rule is selected for any file path and only for files whose filename extension is DOC, and it defines mirroring by 3, striping by 8 and a stripe size of 8 KB. With this rule, any document file will be mirrored twice (three copies of the data will exist in the system for higher availability) and striped across 8 file servers, with a file stripe of 8 kilobytes. Since most such documents typically have file sizes between 32 KB and 100 KB, this rule provides moderate (e.g., 4×) improvement in performance for each individual client, lowers the probability of hotspotting significantly since each file is spread across a total of 24 file servers without wasting too much storage space.

Rule 1304 shows a desired set of aggregation parameters for software source code files that contain valuable intellectual property while being each small in size. The rule applies to any file in the \CODEBASE subtree of the aggregated namespace, and defines mirroring by 4 and no striping. This provides moderate performance increase (e.g., 4×) during program compilation and build, which is the usage pattern where hundreds of files are being read in a batch process and provides excellent protection from data loss due to server failure.

Finally, rule 1305 is a modification of rule 1304 that optimizes the use of storage space in the \CODEBASE subtree. This rule recognizes the fact that source code directories often contain intermediate object code files (with file extension of OBJ) which are a byproduct of the compilation process and can easily be reconstructed if lost. The rule defines an exception from rule 1304, namely that any file in the \CODEBASE subtree that has a filename extension of OBJ will be neither mirrored nor striped. When used together, rules 1304 and 1305 can easily provide optimal storage characteristics for a software engineering department.

This section has described the various mechanisms, algorithms and other elements of the present invention used to achieve the desired behavior of the file switch, namely the ability to aggregate multiple independent file servers into a single, highly scalable switched file system.

While many of the descriptions above used as example the open and the write file transaction requests, one skilled in the art will easily recognize that these descriptions apply and can be easily adapted to other network file protocol transactions while remaining within the spirit of the present invention.

For example, transaction aggregation techniques described for file write transaction can be easily adapted for file read transactions, while recognizing that for file read transactions, the request message is usually a single frame, while the transaction response message usually contains multiple frames. The file switch preferably processes the request by determining to which file servers the read transaction needs to be switched and then sending the requests to those servers (including modified header for each). The file switch preferably processes the response from each file server by first interpreting the response headers found in the first frame received from each of the file servers to which the transaction was switched. Then the file switch prepares an aggregated response header and sends it back to the client, preferably with a portion of the data. Further data frames are sent by the file switch to the client, as the file switch receives more data frames from the file servers; the file switch ensures the correct order of the data it sends to the client. It is also important to recognize that while the file switch switches most of the file protocol transactions, there may be client-initiated transactions that the file switch processes fully by itself For example, such transactions may include the CIFS SMB_ECHO and SMB_NEGOTIATE_PROTOCOL transactions, which may not necessitate immediate interactions with the file servers. In addition, the file switch may generate its own transactions (not necessarily in response to a client-requested transaction) and submit them to the file servers; such transactions may include the CIFS SMB_ECHO request and others. Moreover, the file switch may initiate file protocol transactions with the file servers in order to perform file operations (such as read/write) without having a client request for them; one such example would be moving (i.e., reading and then writing to a new location) files when the number of file servers on which the file switch stores files change.

Aggregating File Switches

As more and more clients are connected to the same file switch and request network file services, a single file switch can become a bottleneck, limiting the access to the file servers. One particularly valuable aspect of the present invention is the ability to aggregate file switches in order to increase the aggregate bandwidth available for accessing the file servers.

Figure 14:
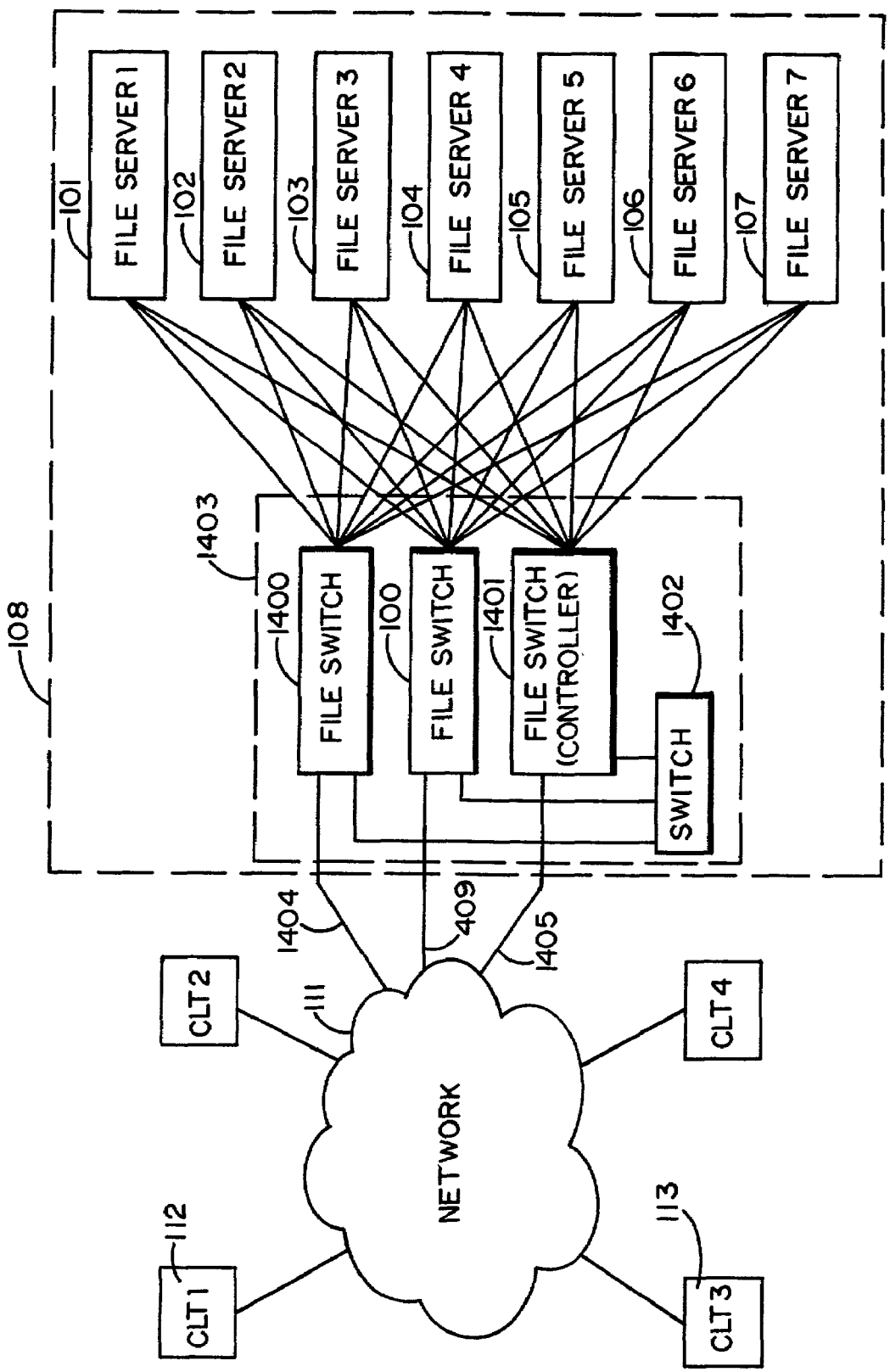
FIG. 14 illustrates aggregation of file switches.

FIG. 14 illustrates a network application in which additional file switches 1400 and 1401 are added and aggregated with the file switch 100. The file switches 100, 1400 and 1401 are preferably connected with each other through separate "uplink" network ports using a layer 2 switch 1402, forming an aggregated switch 1403 with multiple input and output ports. Alternatively the switches 100, 1400 and 1401 can communicate with each other through their front-side connections 109, 1404 and 1405, or through their server-side connections 114. Each of the file switches is connected to each of the servers 101 through 107; these connections are preferably facilitated through layer 2 switches (not shown).

The aggregated file switch 1403, together with the file servers 100 through 107, form a virtual file server 108. The client workstations 112 and client application servers 113 are connected to the virtual file server 108 through the network 111, and one or more of the connections 109, 1404 and 1405. From the standpoint of clients 112 and application servers 113, the virtual file server 108 has multiple network ports accessible through the connections 109, 1404 and 1405. One skilled in the art will recognize that other file switch aggregation configurations are possible, including but not limited to configurations with different numbers of file switches, files servers and file clients.

All file switches 100, 1400, 1401, present the same files to their clients. A client 112 can be connected to any of the file switches and will have access to the same files. Since the file switches appear as clients to the file servers 101 through 107, the synchronization mechanisms that file servers provide for directly connected clients do function to synchronize access among the multiple switches.

All switches from group 1403 are connected to the same set of file servers. From the standpoint of each file server, each file switch is a separate client that complies fully with the network file protocol file sharing and locking rules. As a result, there is no need to have any interaction or synchronization between the file switches with respect to the file transactions being switched.

The synchronization is performed between each of the switches and each of the servers, without requiring interactions directly between the switches in the process of handling network file transactions requested by switches' clients. This allows an unlimited number of switches to share the set of file servers without creating a bottleneck similar to the ones observed in cluster file systems. One skilled in the art will recognize that mechanisms such as sharing, locking, opportunistic locks, etc., continue to work in this three-tiered architecture.

Configuration Sharing

One mechanism that is preferably employed when multiple switches access the same set of file servers and the same set of file systems presented by them is configuration sharing. In order to ensure data integrity and proper operation, all switches 100, 1400 and 1401 in the aggregated switch 1403 maintain synchronization of their configurations: they all know the same set of file servers, in the same order, using the same aggregation rules and perform file system aggregation the same way. The file switches exchange such configuration information during their startup and/or only when the configuration changes. As this operation is not performed in the course of execution of client-requested transactions, it does not create a bottleneck.

One way to arrange such sharing in the aggregate switch 1403 is to designate one of the switches, in our example the switch 1401, as a group controller. Configuration changes, such as those performed by a system administrator, are preferably performed only on the group controller switch 1401; the group controller distributes the configuration to the remaining switches 100 and 1400. The switches 100 and 1400 may further request configuration information from the group controller 1401, when they start up or periodically. One skilled in the art will readily recognize that numerous other ways to share the configuration among all switches in the group are possible.

Load Balancing

Another advantageous mechanism provided by the present invention is load balancing. Since all file switches within an aggregated file switch provide access to the same set of files, any client may be connected to any of the switches. This allows clients to be distributed among the switches so that not all clients are connected to the same switch. This can be achieved by manually configuring each client to use a particular file switch or by automatically distributing the clients when they try to connect to the aggregated file switch 1403.

The selection of which particular switch is going to serve a given client happens when the client connects to the switch. This association preferably does not change for the duration of the client connection.

The load distribution is preferably done through a name resolution service, such as DNS or WINS, that provides a mapping between a name (configured as server name for the clients) and the IP address of a particular file switch.

One possible mechanism is to have the group 1403 be assigned a separate DNS subdomain (e.g., zx1.zforce.com). File switch 1401, which is configured as a group controller also acts as a DNS server for that subdomain. The subdomain preferably contains two host names: admin.zx1.z-force.com and zx1.z-force.com. The name admin.zx1.z-force.com is used for management, the host name zx1.z-force.com is used for file serving (i.e., this is the name clients connect to). The group controller always resolves the admin.zx1.z-force.com host to itself Every time it is asked, it resolves the zx1.z-force.com host name to a different switch from the group, so that different clients end up on different switches. The distribution may be random or round-robin; the distribution can also be based on the current number of connected users and/or recent load on each switch (as the file switches may report their load factor periodically to the group controller 1401). Each of the switches may also have its unique name in the subdomain (e.g., switch3.zx1.z-force.com).

Another mechanism for load balancing is for each file switch to have a different server name and IP address. The system administrator can configure different groups of clients to connect to different file switches (e.g., based on company structure), or use a third-party load balancer or round-robin DNS such as RRDNS.

Yet another mechanism that can be used by the file switches belonging to the same group is to configure the switches with the same server name (e.g., the CIFS server name), and have that name registered as a group name instead of a individual host name. When a client tries to establish a connection to that name, the first switch able to respond will get the client connection. Since typically this will be the least-loaded switch, this mechanism can also be used for load balancing.

One skilled in the art will recognize that other mechanisms can be used to achieve load balancing. One skilled in the art will also recognize that combining a load-balanced front end with independent connections on the back end of the file switch allows practically unlimited scaling up of the bandwidth of the network file system, simply by adding file switches to the group 1403. In such case, one may also increase the number of file servers to which the file switches connect as needed to achieve the desired aggregate performance.

Failover

Another mechanism provided by the present invention is failover between the file switches participating in group 1403.

The group controller 1401 monitors all switches in the group by sending a heartbeat signal to each of them periodically. If a switch does not respond after a given number of timed out retries, the group controller considers that switch failed. The group controller then preferably assigns the IP address of the failed switch to another switch in the group, so that clients that were interacting with the failed switch will be able to reach a working switch instead.

With this failover mechanism, in the case of a switch failure, all connections between the clients and the failed switch will be lost, as will be any pending transactions. However, the clients will receive a proper indication of this condition (usually timeout of the pending commands and/or TCP connection reset upon attempt to send data). Most client operating systems will reconnect to the newly assigned switch with minimal or no user intervention.

For aggregated switches in which a group controller performs load balancing by the method described in the load balancing section above, the clients of the failed switch will reconnect to different switches, keeping the load on the group even. When an external load balancing method is used, all clients will reconnect to the switch that the group controller chooses to take the IP address (and host name) of the failed switch.

When a switch is returned to the group, it is preferably assigned a new IP address (because current connections may exist to its old IP address on the takeover switch). The group controller directs new client connections to it until the group is balanced. Additionally, the group controller may request that other switches in the group drop some of their inactive client connections (if any), so that those users can reconnect to the newly recovered switch whenever they become active.

In case the group controller switch fails, another switch may be previously designated as a backup group controller (or be elected as such), and will then detect this condition, and take over the group controller role. The backup group controller will then preferably notify all other switches in the group, so that they can start requesting group management functions from it. It may also assign another switch in the group (if one exists) the role of a backup group controller. The group controller role is returned to the original switch once it is restored to operation.

Another possible failure is a failure of a cable or a layer 2 switch such as 1402. To handle such a failure, the network infrastructure in the switched file system—layer 2 (L2) switches and cabling—can be made redundant using the standard mesh methods for IP networks. File switches preferably have redundant ports to allow fully redundant wiring configurations.

Failure of a L2 switch or cable to a file server, if the connection is not redundant, is equivalent to failure of that file server; otherwise it can be ignored (except that an administrative alert is sent if so configured). Failure of a L2 switch, or a cable, to clients (LAN side), is similar to a failure of a file switch because clients cannot reach the file switch. Failure of a L2 switch 1402 or cable on the uplink between file switches is not considered a failure as long as communication between switches can be obtained through either the front or the back side ports.

One skilled in the art will recognize that the combination of bandwidth aggregation, load balancing and failover enables high-performance, high-availability network file systems.

File Switch Architecture

Figure 20:
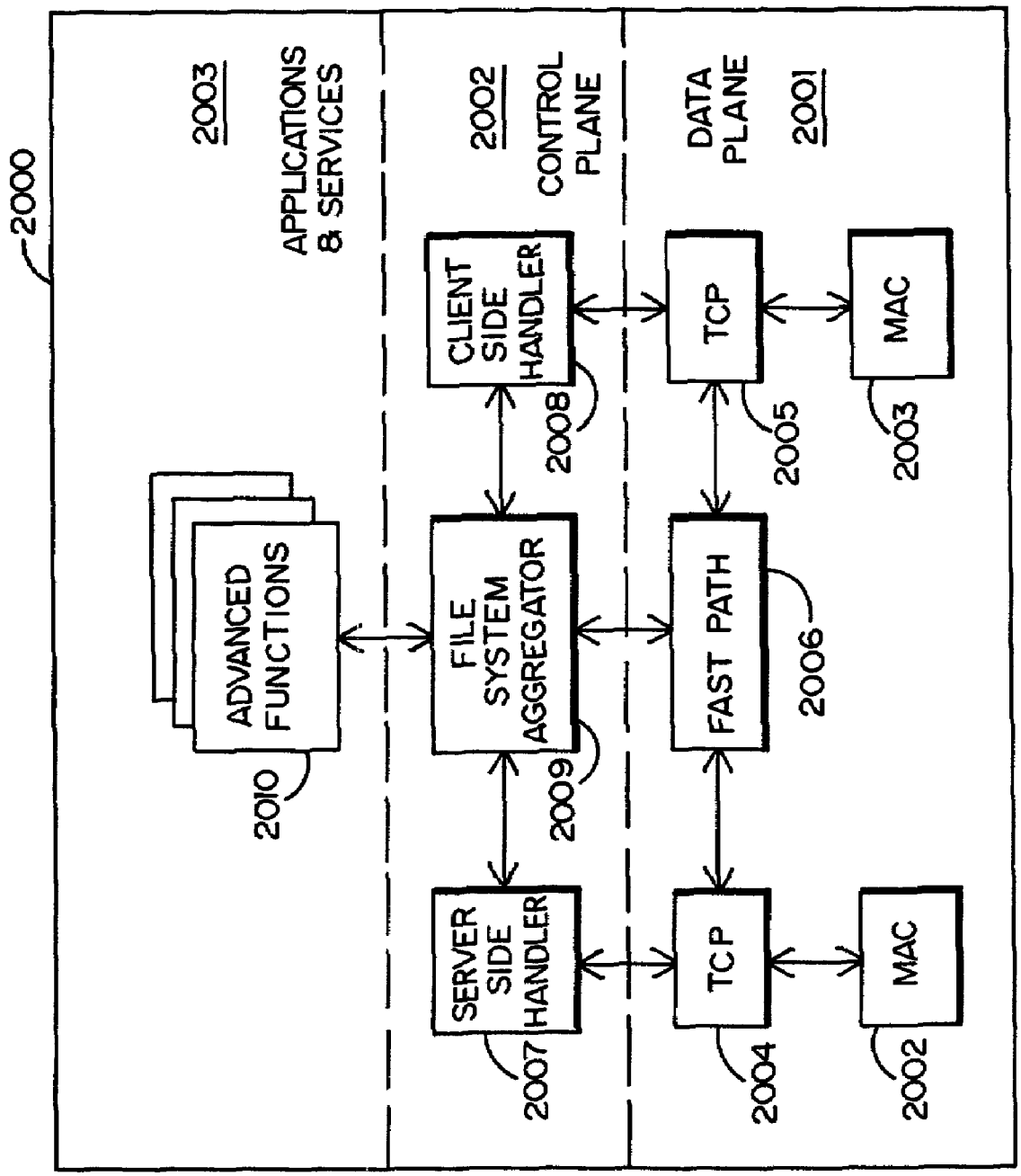
FIG. 20 is a block diagram illustrating the preferred file switch architecture.

FIG. 20 illustrates the preferred architecture for a file switch. The architecture of the file switch 2000 is preferably divided in three planes: the data plane 2001, the control plane 2002, and the applications and services plane 2003.

The data plane 2001 includes a front-side network interface 2002, a back-side network interface 2003, a front-side TCP/IP protocol stack 2004, a back-side TCP/IP protocol stack 2005, and a fast path handler 2006. The control plane 2002 includes the network protocol server side handler 2007, the network protocol client side handler 2008 and the file system aggregator 2009. The applications and services plane 2003 includes various handlers 2010 for advanced services (such as usage tracking, and adaptive storage management, to name a few).

Requests for file protocol transactions coming from client computers are received on the network interface 2002. The TCP stack 2004 handles the TCP/IP protocol, ensuring the reliable connection with the client and proper order of data. The request may be further processed by the fast path handler 2006 which performs transaction switching for network file protocol transactions that can be designated as fast-path transactions (such as read and write). Alternatively, for transactions that can be designated as slow-path transactions (such as deleting a file), the request may be further processed by the server-side handler 2007, which handles the server side of the network file protocol and forwards the request to the file system aggregator 2009.

Fast-path transactions are switched by the fast path handler 2006, which sends further the transaction messages through the back-side TCP protocol stack 2005. The latter ensures that the servers receive all parts of any messages destined to them in proper order and without lost or duplicated data. The back-side TCP protocol stack 2005 transmits frames to the file servers through the back-side network interface 2003. The fast path handler 2006 may need to understand and implement portions of the network file protocol being switched. It preferably processes each frame received from any of the TCP stacks immediately, without waiting for the full transaction message to arrive.

The network protocol requests for slow-path transactions are decoded by the server-side handler 2007, which preferably implements the server side of the network file protocol (i.e., understands requests that are ordinarily sent to CIFS, NFS or similar servers). The requests are further processed by the file system aggregator 2009, which performs transaction switching and aggregation. It then sends requests to the file servers using the client-side handler 2008, which implements the client side of the network file protocol (i.e., issues network file protocol requests typically issued by network file clients). One of the benefits of this method of processing slow-path transactions is that the file system aggregator can be to a large degree independent of the particular network file protocols (and their specific versions) being switched; most of the specifics can be handled by the server-side handler 2007 and the client-side handler 2008.

Network protocol responses from the servers are processed in the reverse order of the order described above.

Advanced functions, such as management, synchronization of configuration between switches, data migration and others, are preferably implemented as separate handlers 2010 in the application and services plane 2003.

One skilled in the relevant art will easily recognize that various modifications of this architecture can work well for the inventive file switch while preserving the spirit of the present invention. For example, more network interfaces 2002 and 2003 can be added, and the two network interfaces can be replaced by a single network interface wherein the client traffic and the server traffic can be separated by the TCP protocol stack. The TCP protocol stack 2004 and 2005 can be merged together (in many conventional computer architectures there is a single TCP/IP protocol stack that handles multiple network adapters).

In addition, multiple server-side handlers 2007 can be added in order to process multiple network file protocols or different versions thereof Similarly, multiple client-side handlers 2008 can be added in order to support multiple network protocols or their multiple versions in interacting with the file servers.

Various other services, such as DHCP, DNS, load-balancing, command-line and/or web-based management, SNMP, etc., can be added to the architecture described above.

The implementation of the architecture described above can be arranged in many possible ways. For example, the network interfaces may be implemented in hardware, while the rest of the data plane and the two remaining planes are fully implemented in software. Alternatively, the data plane may be implemented in hardware (e.g., by using Field-Programmable Gate Arrays, Application-Specific Integrated Circuits, switch fabrics, network processors, etc.), while the control plane and the applications plane may be implemented in software. In addition, the control plane may be further implemented or accelerated in hardware. Moreover, it may be advantageous to implement portions of a certain plane (e.g., the data plane or the control plane) by providing accelerated functions in hardware while maintaining the rest of the plane's functionality (such as setup, initialization and other slow functions) in software.

Figure 21:
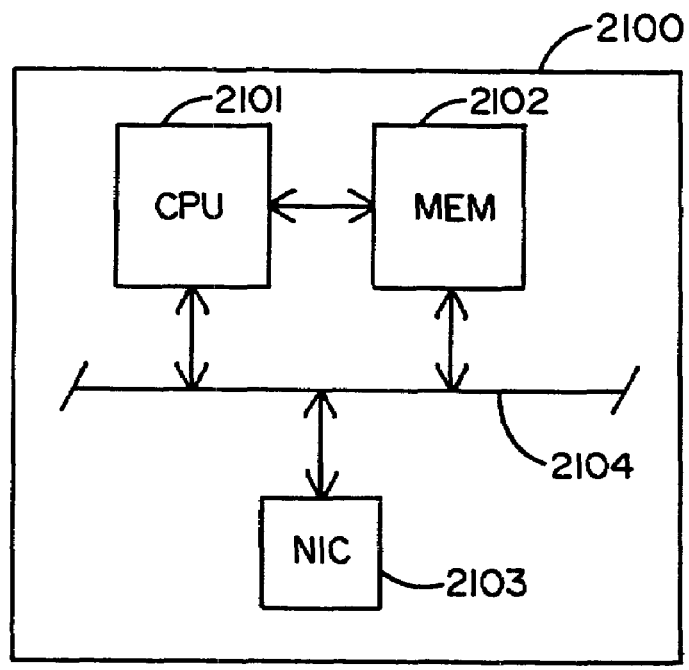
FIG. 21 illustrates general-purpose computer hardware architecture for a file switch.

FIG. 21 illustrates a first possible hardware architecture for implementing a file switch. In this example, the file switch implementation is based on general-purpose computer hardware. The file switch 2100 preferably includes a processor 2101, a memory 2102, a peripheral interconnect bus 2104 and one or more network interface cards 2103.

Figure 22:
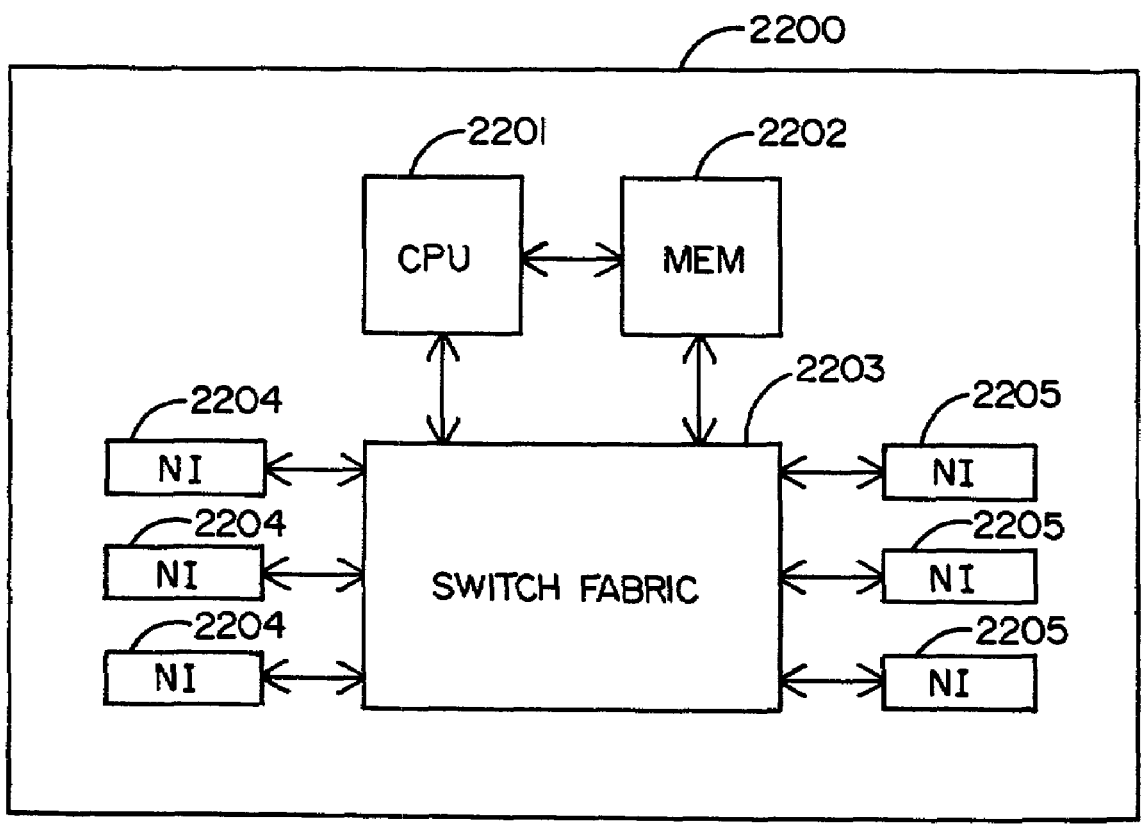
FIG. 22 illustrates general-purpose switch hardware architecture for a file switch.

FIG. 22 illustrates another possible hardware architecture for implementing a file switch. In this example, the file switch implementation is based on the hardware architecture typical of network switches. The switch 2200 preferably includes a processor 2201, a memory 2202, a switch fabric 2203, multiple front-side network interfaces 2204 and multiple back-side network interfaces 2205.

One skilled in the art will easily recognize that various other architectures for implementing a file switch are possible. In addition, while most of the particular choices made in implementing the file switch (such as those described above) are preferably driven by the performance and cost targets of the file switch, all various implementations fall within the spirit of the present invention.

Switched File System

Another aspect of the present invention is a switched file system. A switched file system can be simply defined as a network including one or more file switches and one or more file servers.

The switched file system is a file system since it exposes files as a method for sharing disk storage. The switched file system is a network file system, since it provides network file system services through a network file protocol—the file switches act as network file servers and the group of file switches may appear as a single file server.

The switched file system is a distributed file system as it aggregates the namespaces of multiple file servers. It is also a parallel file system, as it can utilize multiple file servers in parallel to satisfy the request of a single network file client. Therefore, the switched file system is a new type of distributed, parallel network file system.

Figure 15:
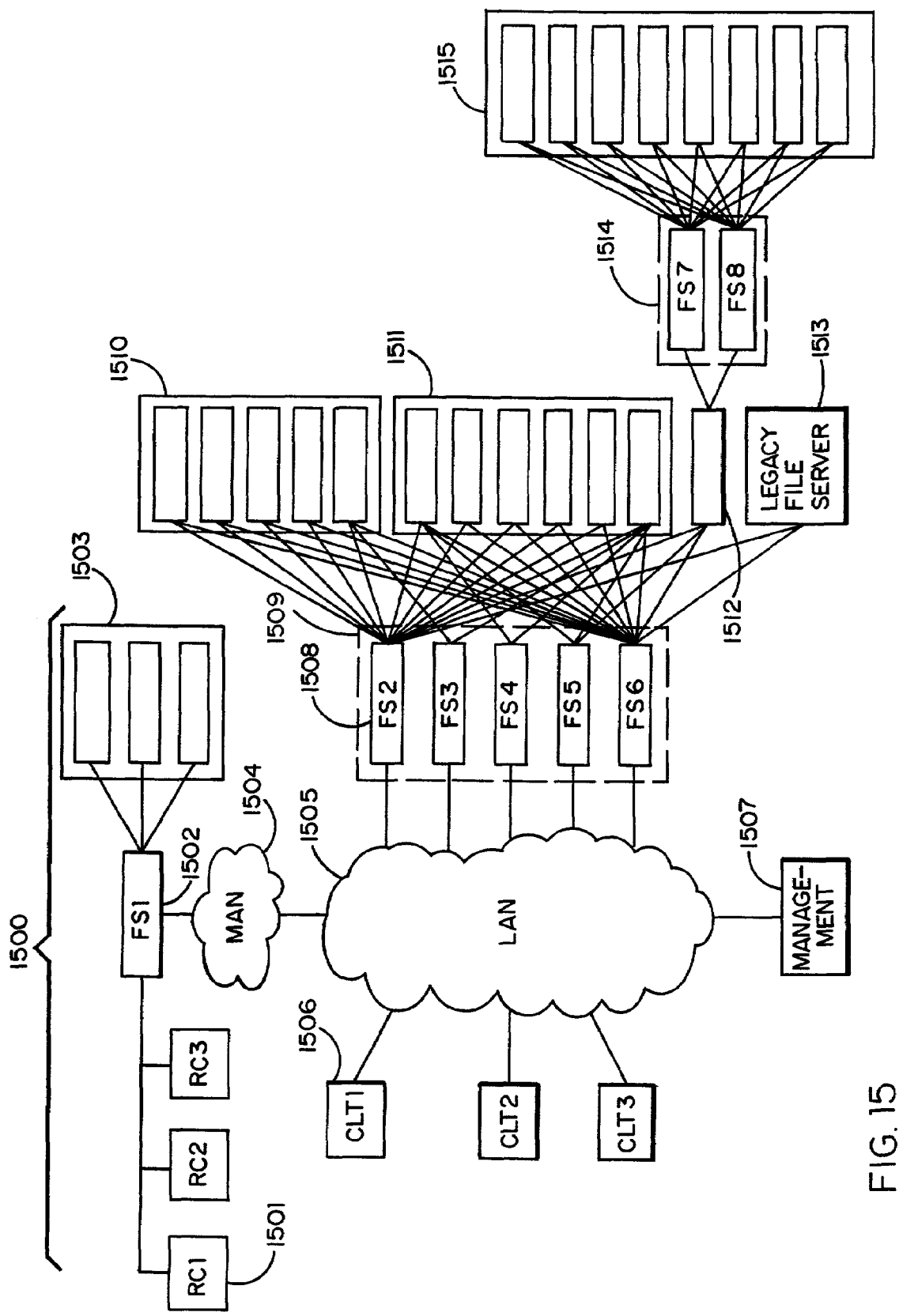
FIG. 15 illustrates a switched file system.

FIG. 15 illustrates a switched file system, including many of its configurations and applications. The example switched file system consists of the following elements: File switches 1508 aggregated in a group 1509, connected to two arrays of file servers (also called NAS arrays) 1510 and 1511; also connected to a legacy file server 1513, typically containing archive and other pre-file switch content, which it aggregates only by namespace (does not perform file aggregation). The file switch group 1509 also aggregates the namespace of another switched file system provided by the file switch group 1514 connected to NAS array 1515 and connected to the group 1509 through a layer 2 switch 1512.

The services of the group 1509 are provided to the network 1505 consisting of clients 1506, a management workstation 1507 and a connection to a metro-area network 1504. The metro-area network 1504 provides the remote LAN 1500 and its clients 1501 with file services made available by group 1509. In order to improve the access to these services, the remote LAN 1500 also includes a file switch 1502, which acts as a gateway to the group 1509 and caches files locally to the NAS array 1503.

Topologies

The switched file system provides many combinations of file system aggregation and supports different topologies.

One of the available topologies is virtualization. In virtualization, the switched file system aggregates the namespace exposed by a single file server 1513 without further aggregating its files on other servers. One of the mechanisms available for this is the namespace aggregation technique described herein. The virtualization allows pre-existing file servers to be made available to clients of the switched file system and included in its logical namespace. This eases the adoption of the switched file system (SFS) and provides an incremental approach to adoption.

Another available topology is NAS array. The switched file system can have a set of file servers 1510, preferably with similar capacity and performance characteristics, designated as a NAS array. The file switches participating in the SFS distribute files across the file servers in the NAS array, by using the directory, file object and data aggregation mechanisms described herein. NAS arrays provide high performance and high availability. Multiple NAS arrays can be configured in the same SFS, and their namespaces can be aggregated with virtualized file servers to present a unified namespace.

Yet another available topology is cascading. In a cascaded configuration, one or more switched file systems can be connected within another switched file system, effectively playing the role of a file server in that other switched file system. In our example, the file switches 1514 and the NAS array 1515 comprise a small switched file system, which is aggregated in the namespace of the switched file system presented by the group 1509. Since the file switches 1514 appear as a file server to the file switches 1509, the latter can aggregate the namespace provided by the former the same way as the virtualized server 1513. One skilled in the art will easily recognize that multiple instances of the switched file system comprising the switches 1514 and the NAS array 1515 may exist, and may be aggregated by the switches in the group 1509 in any and all ways in which the latter may aggregate regular file servers, including data aggregation, directory aggregation, etc.

One other topology is gateway. A file switch 1502, preferably having its own NAS array 1503, acts as a gateway to clients locally connected to it, and provides access to the file services made available by group 1509. An advantage of this topology is that the connection between 1509 and 1502, such as the MAN 1504, may have lower bandwidth than the local networks 1500 and 1505. The gateway topology allows the gateway switch 1502 to cache locally on the NAS array 1503 files normally residing on the file system exposed by the group 1509. Since the switch 1502 appears as just another client to 1509, all locking, oplocks and other client semantics are available to the switch 1502 to provide caching.

For example, when a client 1501 requests a file open transaction from the file switch 1502, the latter forwards the transaction to one of the file switches 1508 in the group 1509. If the transaction is completed successfully, the switch 1502 may obtain an exclusive lock or opportunistic lock on the requested file and copy the file to its local NAS array 1503. Even if the client 1501 closes the file, the switch 1502 may still keep the file open on the group 1509, so as to maintain the lock. If the client 1501 (or another client on the 1500 LAN) requests an open on the same file, the switch 1502 can satisfy the request without interacting with the group 1509 (and without any communications through the slower network 1504). As long as 1502 maintains the cached file, any further read and write requests can be satisfied locally, on the NAS array 1503 without accessing the slower network 1504 and the group 1509.

If a client 1506 then requests open over the same file, the group 1509 may attempt to break the opportunistic lock maintained by the switch 1502; in such case, the latter will write back to 1509 all cached changes and stop caching the file locally. One skilled in the art will recognize other mechanisms are also possible to maintain cache coherency while providing optimal access to file systems and file data. The gateway topology enables access to remote storage, such as storage utilities provided by Storage Service Provider (SSP) companies and reducing the bandwidth requirements to the interconnect, while maintaining high performance data access. This topology also allows globally distributed file systems with local caching.

Client's View of the Switched File System

Figure 16:
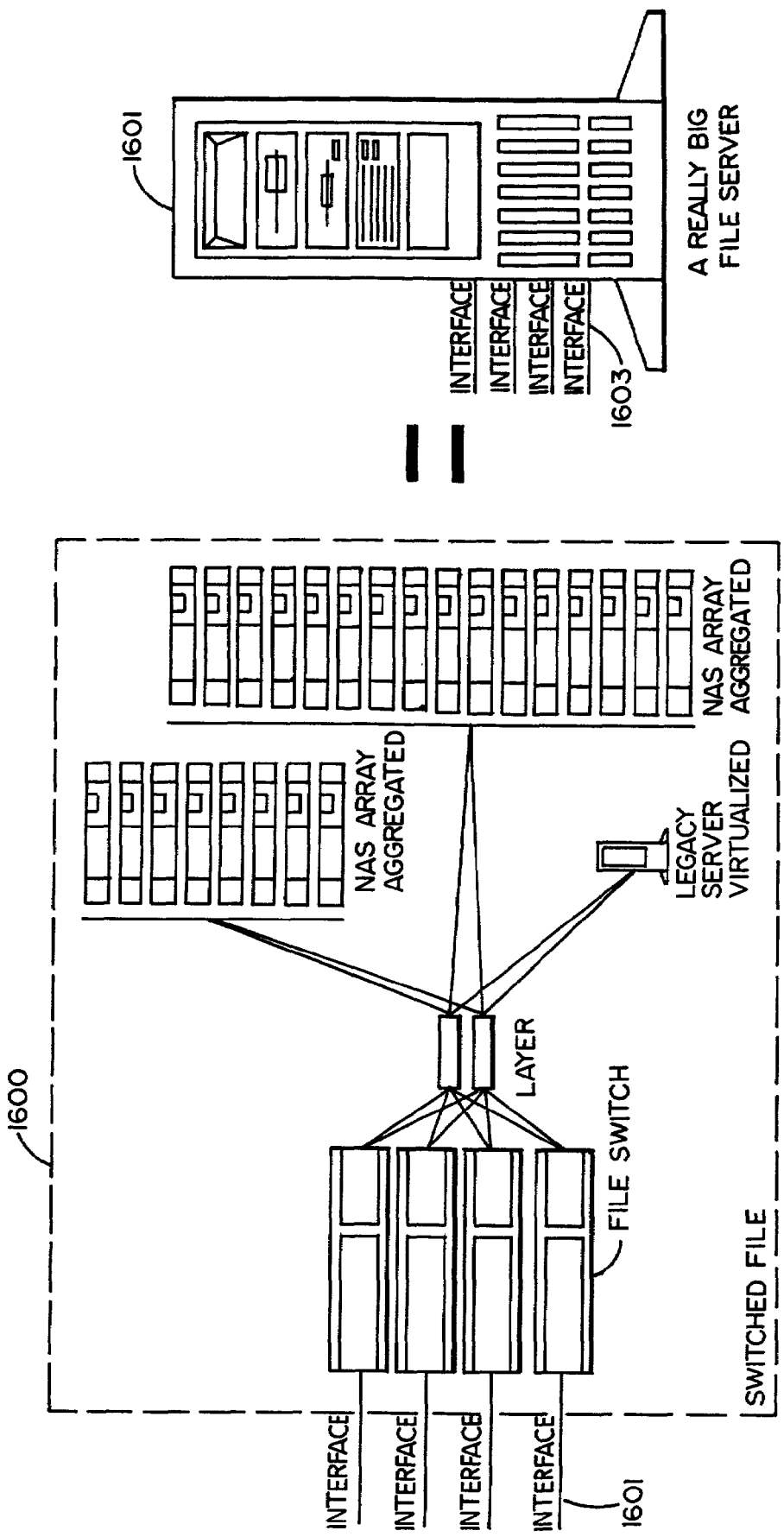
FIG. 16 illustrates the client's view of a switched file system.
Figure 17:
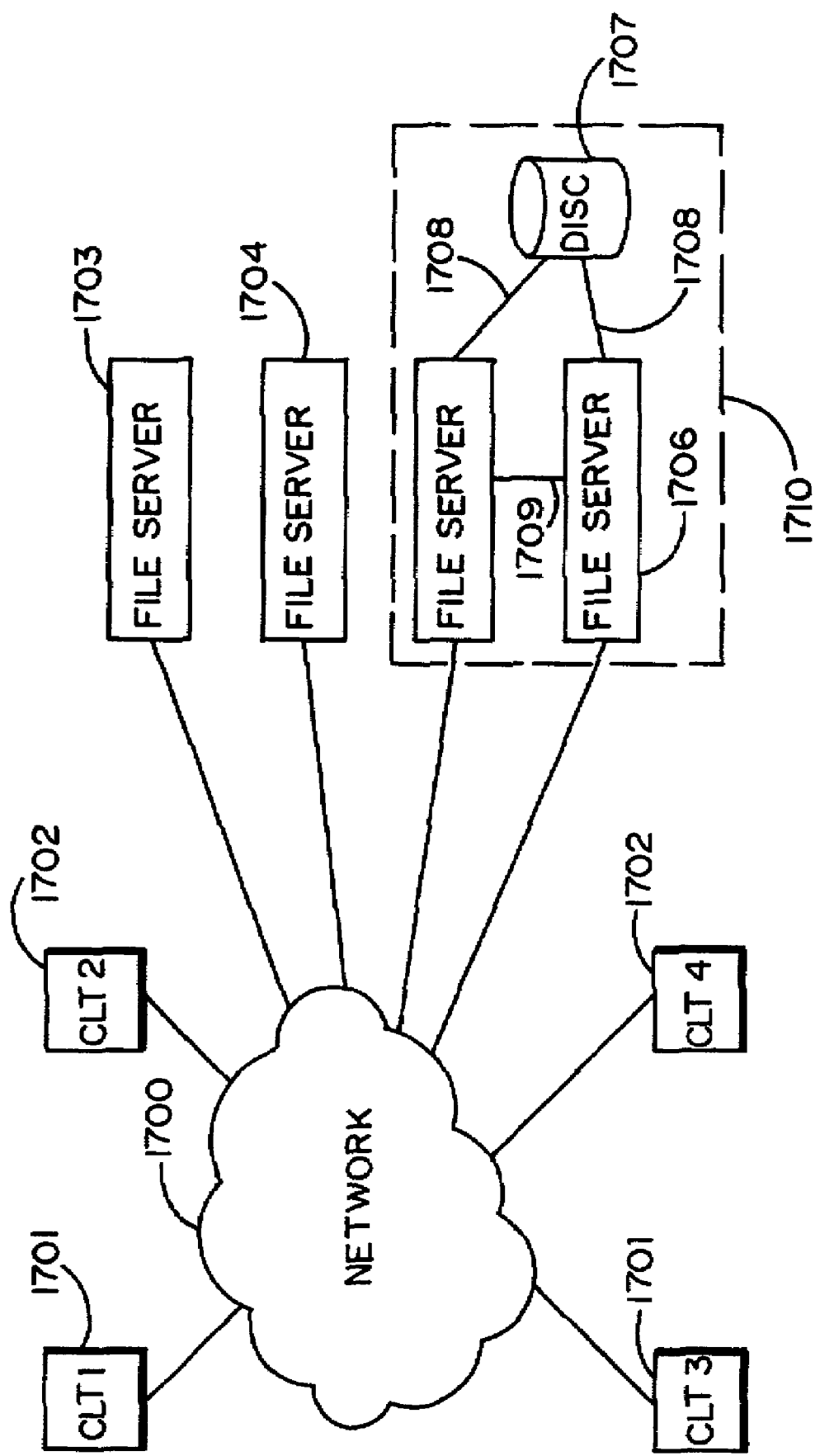
FIG. 17 illustrates a prior art storage network including a distributed file system and a clustered file system.

From the standpoint of a network file client, such as 1506, the switched file system appears as a single file server with multiple network interfaces. FIG. 16 illustrates the similarity between a switched file system and a single file server. Network clients connect to the switched file system 1600 through the interfaces 1602 as they would connect to the single file server 1601 though its interfaces 1603.

The switched file system preferably provides a single namespace. It allows network file clients to use standard client software using widely standardized network file protocols for accessing file servers, such as the CIFS and NFS protocols. The ability of standard file client software to access the switched file system simplifies adoption and also allows changes to the switched file system mechanisms and topologies to be performed transparently to all clients.

Administrator's View of the Switched File System

An administrator's view of the switched file system is to a degree similar to the client's view. For most operations, the administrator views the switched file system 1600 as if it were a single, high-capacity, high-performance, and highly available file server 1601. For the purposes of management and reconfiguration it preferably appears as a single file server. The file switches preferably support the same file server management protocols (such as MSRAP) as single CIFS or NFS file servers do. The switched file system can be configured to expose shares/mount points in the aggregated namespace to their clients.

Administrators can add individual file servers (using the virtualization topology), new NAS arrays, as well as add or remove multiple file servers to or from existing NAS arrays. In case the administrator adds one or more file servers to an existing NAS array, the file switches can discover the newly added servers, and, preferably on administrator's request, redistribute the files and their data across all servers, including the newly added ones, thus extending both the capacity and the performance of the file system. In case the administrator wishes to remove one or more file servers from a NAS array, he or she can request that a file switch free up the specified servers (by redistributing the files to the file servers that remain in the NAS array). Upon completion of that process, the file switches notifies the administrator that the selected file servers are free and can be removed without data loss.

The switched file system provides high availability by distributing the work among many file switches and file servers. Failure of a file server or a file switch typically does not cause loss of data or loss of access. The administrator can be notified of the failure and replace or repair the failed component.

The switched file system preferably tracks the access patterns and can report statistical information to the administrator. Based on this information, the administrator can tune up the performance and storage capacity utilization of the switched file system, by adding or reconfiguring NAS arrays, file switches and by changing aggregation rules on the file switches.

Scaling in SFS

Unlike prior art solutions, the switched file system scales independently in multiple directions without inherent limitations.

The SFS scales capacity and performance by adding more file servers to a NAS array and distributing files across all. It scales access bandwidth by adding more file switches to a connected group and accesses the same set of file servers, providing wider access path (multiple network connections).

The SFS also scales in geographical distribution by adding cascaded file switches (or switched file system) and gateway file switches.

Availability Issues

The switched file system provides highly available file services to its network clients. Failures of file servers and of file switches without data and access loss have been described herein.

Another mechanism for high availability is remote asynchronous mirroring. A file switch (or group of file switches), upon receiving and processing file transactions, can also queue and send those transactions that modify the file system (such as file creation, writing, deletion, etc.) asynchronously to a remote location, where another switched file system, or regular file server, can keep a mirror of the switched file system (or portion thereof). The fact that the transactions are sent asynchronously to the remote site allows local clients to continue operation without delay; while the file system is being synchronized with a remote copy so as to minimize data loss in case of catastrophic network site failure.

Advanced Capabilities

Usage Tracking

The file switch processes all file protocol transactions between the file clients and file servers. As a result of its middle position in the three-tiered architecture, the file switch is in a position to collect various file usage information. Examples of such information include: (a) login and logout times and time logged in; (b) number of files accessed; (c) amount of data read and amount of data written; (d) number of network file protocol transactions, preferably broken down by transaction types; (e) areas or subtrees accessed by a given user; (f) number of accesses to a given file and directory from a given user, group of users or all users.

The file switch collects this information and makes it available to the network administrator, to a user or to some form of automated computing systems.

One aspect of the present invention is a file services billing system in which one or more file switches collect usage information and send this information to a billing system. The collection of information preferably includes the following steps:

1. Each of the file switches in a group collects usage information and periodically reports it to the file switch that acts as a group controller.
2. The group controller periodically sends (either automatically or upon request) this information to a billing application
3. The billing application uses part or all of this information to prepare a statement and, if desired, bill for a given period of time. The statement preferably provides the number of users that have accessed file services, the number of files accessed, the number of read, write and other transactions performed, the number of bytes read and/or written. The statement can also be prepared in a form similar to telephone bills, stating the specific file accesses made, the time at which they were made and the amount of data transferred.

Another aspect of the present invention is a system that provides guaranteed quality of service to network file clients, as well priority between different network clients. The system preferably comprises:

1. Configuration data preferably residing in the memory of a file switch. The configuration data specifies network access limits (in transactions per second and/or amount of data exchanged per second) that are to be applied to users, group of users, files and/or group of files. The configuration data preferably specifies further the priority that will be applied among network clients that request operations on behalf of the specified users; each user or group of users is preferably assigned a priority level. The configuration data may be reside within in the memory of the file switch, or it may be obtained from an external service, such as Active Directory or LDAP.
2. During handling of network file protocol transactions, the file switch gives preference to clients that request transactions on behalf of users with higher priority level, such as with the same mechanism whereby higher priority transactions are executed before those of lower priority.
3. The file switch additionally measures the number of transactions per second and the amount of data read/written per second from each client. If a client exceeds the limit specified in the configuration data (for this client or the user on whose behalf the transaction is requested), the file switch delays the execution of the transaction so that the rate of transactions and data exchange fits within the specified limits. Thus, if the configuration data is properly specified in such as way that the sum of limits for each of the connected clients doesn't exceed the capacity of the switch (or group of switches) and file servers connected to them, it is possible to ensure that each client can get a guaranteed minimum transaction or data exchange rate.
4. A modification of this mechanism is for the file switch to start enforcing the limits only if the load on the switch and/or the file servers approaches the limitations of the system.
5. Yet another modification is to limit the number of users that can log in to the file system. If the sum of limits configured for each of the logged in users exceeds the capacity of the file system (file switches and file servers), new users will be refused connection/log in.

One skilled in the art will recognize that other advantageous applications of the usage tracking information exist and are easily derived from those described herein.

Adaptive Storage Management

The file switch also may collect information about the access to individual files and groups of files. The information collected may include the latest date a file is accessed for reading, the latest date on which a file has been modified, number of network clients simultaneously accessing the file, type and frequency of file operations requested on the file, predominant access pattern (such as sequential, random, random with some sequential, etc.). The information may be further aggregated per file type (or extension) and/or per root path in the file system.

Based on this information, a subsystem in the file switch may determine a different way in which a given file or set of files should be distributed on the file servers. The determination may be for a specific file, or by deriving an aggregation rule (such as the ones described herein) or a modification of the aggregation parameters of an existing aggregation rule. The file switch can use the new rule only for newly created files and it can redistribute existing files according to the new rules.

The operation of determination of the new rule based on the collected access information may be performed on the switch, by an administrator acting upon this information, or by a physically separate automated system, which performs analysis over the collected access information and determines the new rules.

This feature of the file switch improves the efficiency of the storage network. It allows old and rarely used files to be kept with a fewer number of copies and with an aggregation mechanism that optimizes the capacity used by such files. It allows new and frequently accessed files to be distributed among more file servers, have large number of copies that can be accessed in parallel, and have aggregation parameters that optimize the load on the file servers and improve the access performance for clients.

This feature also allows different sets of files to be optimized with the best applicable aggregation rules depending on the access patterns collected for this set of files. For example, database files may be frequently open for exclusive access (i.e., by a single network client) and be accessed at random locations; a low number of mirrors (e.g., 2) and a low number of stripes with a large stripe size may be optimal for this file type. For video streaming files, such as MPEG movies, the typical access pattern may be multiple concurrent readers, reading sequentially from different areas of the file simultaneously; for such files, a better aggregation parameter set may include a high number of mirror copies, a high number of stripes and a relatively small stripe size.

In addition, the current utilization of the storage capacity of the file servers and their relative load can be included in the information collected. This information may be used by the file switch to change the distribution of files among the file servers, so as to achieve better utilization of the storage capacity and more even load on the file servers.

Unlike existing hierarchical storage management systems, this system keeps the old and infrequently accessed files on the same type of storage as new and frequently accessed files, while still reducing the cost of storing the former and optimizing the access bandwidth to the latter.

Key elements of this feature are the automated collection of access data, the making of the decision to change the way files are stored and the execution of this decision. As a set, they allow the file switch and the switched file system to provide a storage network with optimum or near optimum utilization while lowering the management costs of the system. All these benefits can be obtained without the necessity to install and maintain additional software on the network clients or on the network servers.

Secure Remote Storage

Another benefit of having the file switch on the data path between network clients and network servers is that the file switch can modify the data being read and written to files in advantageous ways.

For example, the file switch 1502 in FIG. 15 can be configured with one or more encryption keys. As clients 1501 request file write transactions, the file switch 1502 encrypts the payload of the transaction, so that the data will end up being stored encrypted on the NAS array 1510 (note that the transaction payload for read and write request is the data that represents the contents of the file). As clients 1501 request file read transactions and upon receiving the response data for each transaction, the file switch 1502 decrypts the payload of the transactions before forwarding the payload back to the client 1501 that requested the transaction. The preferred encryption technology is a symmetric-key encryption, such as the Data Encryption Standard (DES).

As a result, the client can access the file system as if it accesses a file system on a single file server attached locally to the network 1500, while the data is actually being stored encrypted on the NAS array. Note that this is done transparently to the client 1501, the file switches 1508 and the NAS array 1510.

One advantage of this method of encryption and the devices and systems that provide it is that organizations (e.g., enterprises) can outsource the storage to other organizations (e.g., storage service providers or storage utilities). The ability to encrypt the file contents allows greater security of the privacy of the data belonging to the enterprise and can facilitate the adoption of storage utilities. Note that the encryption key is preferably configured only in the file switch 1502, which preferably resides on the enterprise's premises and only the enterprise has physical access to it; as a result, the security of the encryption key can be ensured. At the same time, since the logical structure of the file system is intact, the storage utility can manage, backup and restore the data without hindrance.

In addition, the file switch can encrypt the names of files and directories, using the same or different encryption key. This will add further security, since the names of files and directories may contain secret information, such as customer names.

It is possible for the file switch 1502 to contain and use multiple encryption keys (such as different keys for different user groups), as well as having multiple switches (a group of file switches) in place of the file switch 1502, all preferably configured with the same encryption keys. In addition, the file switches may utilize specialized hardware that accelerates the encryption and decryption of data. One skilled in the art will recognize that other topologies and encryption algorithms are possible without modifying the spirit of the present invention.

Snapshots

Snapshots are views of a given file, portion of a file system or whole file system as of a given moment of time. Snapshots can be used as a source for backups (thus allowing to backup from a steady, non-changing copy of the data rather than the live data), as backups that provide the ability to obtain data that has been removed or altered since the snapshot is made, and many other uses.

The present invention also provides a mechanism for creating snapshots of the files in the switched file system. One way to achieve this is to have an additional mirror for all files. For simplicity, let us assume that all files in the switched file system are not striped and are mirrored in three copies. To take snapshot, the file switch has to internally change the aggregation rule, so that now all files will be considered mirrored in only two copies, leaving the third copy intact (frozen). Clients that request reading or modifying the files will be given access to the two copies only. Clients that request reading the snapshot, will be given access to the third copy. This way, even though clients can keep modifying the files (the first two copies), the third copy remains as of the time the rule was changed.

Before changing the rule as described above, the switch preferably waits to complete any currently pending transactions and queues up (without executing) any newly requested transactions. Once all pending transactions complete, the file switch changes the rule and starts executing the queued up transactions. This mechanism further ensures the consistency of the shapshot (i.e., that all files in the snapshot will have their version as of the same exact time).

Multiple file switches in a group can synchronize the moment of modifying the rules so that, even in the case of multiple file switches connected to the same set of servers and being accessed by multiple clients, the shapshot can be made consistent.

Journaling Backup

Another aspect of the present invention is a system for backing up file system data through journaling. The journaling backup is performed by a journaling file switch, which in addition to the file servers to which it distributes the file system files (primary file servers) is also connected to a secondary file server (or to another switched files system).

The journaling file switch distinguishes between destructive transactions, which modify the file system (such as creation of files, writing data to files, deleting directories, etc.), and nondestructive transactions, which do not alter the file system (such as file read, enumeration of directory, opening and existing file, etc.).

When a file client requests a destructive transaction, the journaling file switch switches the transaction to the set of primary file servers (as non-journaling file switches do), and in addition, sends the transaction to the secondary file server. When the journaling file switch receives the transaction responses from the primary servers, it completes the client's transaction; the transaction with the secondary file server may complete later. When a file client requests a non-destructive transaction, the journaling file switch switches the transaction only to the set of primary file servers, without involving the secondary file server.

The result is that all operations that change the file system are sent to the secondary file server, so that the file system on the secondary file server mirrors the file system stored on the set of primary servers. This provides increased redundancy of the data in case of catastrophic failure (such as physical destruction of the whole set of primary servers), especially if the secondary server is physically stored in a remote location.

Note that the performance available to clients is not affected, since although the secondary server may be slower and be connected to the file switch through a lower-bandwidth, higher-latency network, the file switch does not delay the completion of the transactions to the clients until the secondary server has completed the transaction. As only a small portion of file system transactions are actually destructive, most of the transactions do not load the secondary server. In case higher bandwidth is needed for the secondary server, it can be replaced with a cascaded switched file system (as described herein).

Alternatively, the journaling file switch (or a separate device inserted between the journaling file switch and the secondary server) can store the destructive transactions in a log file, instead of executing them on the secondary server. Each transaction is logged onto the secondary file server with its time, fill set of transaction parameters (such as file name) and payload. This log can be used to determine the cause of a failure (such as an application writing wrong data or to the wrong file), and to restore the file system or obtain a view of the file system as of a given moment in time. For example, specialized software may be used to specify the desired moment in time and present to regular file clients a view of the file system as of the specified time.

Global Storage

The gateway topology for file switches illustrated in FIG. 15 by the file switch 1502, its clients 1501 and its attached file servers 1503 can be expanded to enable a globally distributed storage system. To do this, the file switch 1502 will preferably not only cache remote files obtained from the group 1509 but it will also store other files on the NAS array 1503 or on a separate NAS array.

Figure 18:
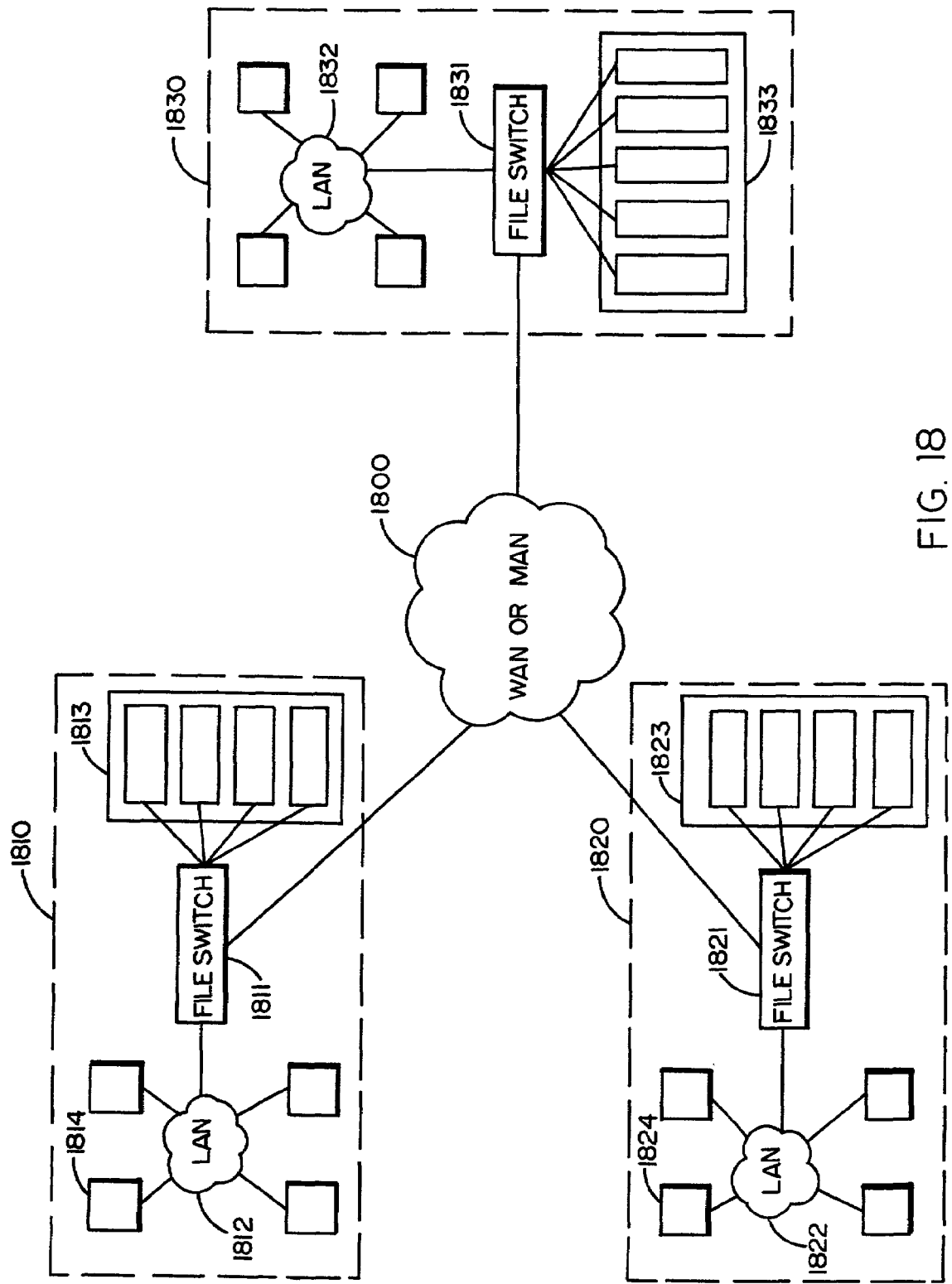
FIG. 18 illustrates global storage using file switches.

FIG. 18 illustrates a globally distributed switched file system. The sites 1810, 1820 and 1830 are connected through a wide area network 1800. Each of the sites has its own network 1812, 1822 and 1832, respectively. Each site network also has local switched file systems comprised of the file switches 1811, 1821 and 1831, and of the file server arrays 1813, 1823 and 1833, respectively. The file switches 1811, 1821 and 1831 preferably have the gateway capabilities described for the file switch 1502.

For file clients, each of the file switches provides access to the file system stored on its respective file server array. Occasionally, a file client 1814 may request a remote file, which is not located on the file server array 1813 attached directly to the client's file switch 1811. In this case, the switch 1811 acts as a gateway and forwards the transaction to the file switch 1821 on the site that contains the requested file. The switch 1821 performs the requested transaction as if it was requested by a file client attached to that switch's local network 1822. The originating file switch 1811 receives the response and returns it to the requesting client 1814.

The file switch 1811 will preferably cache the file obtained from the file switch 1821 in order to increase the access bandwidth and reduce the access latency of clients from the network 1812 to that file. Upon closing of the file or at a later time, or upon request from the switch 1821, the switch 1811 will update the changes cached locally. To do so, it will generate write file transactions to the switch 1821 and close the file, so that the file array 1823 will now have the most recent version of the file as it may be modified by the client 1814. Note that the switch 1821 may request such update upon request from its local client 1824 to open the same file.

This caching and update request mechanism is preferably implemented by using opportunistic lock (oplock) semantics such as the ones found in the CIFS file protocol. Oplock semantics should be already supported by the file switch 1821 in order to allow client-side caching on the network 1822, so that no special protocols for inter-switch caching and update are necessary. The same file (e.g., a file residing on the file array 1823) can be open simultaneously from multiple clients from all sites, although it may not be cached by any of the multiple clients.

Depending on the type of sites, their geographical location and the amount of traffic, the sites 1810, 1820 and 1830 can be connected through a wide area network such as 1800, through a metro-area network, X.25, or a dedicated connection. Multiple connections may be available between any two of the sites. The topology can be expanded to any topology supported by IP networks. More or fewer sites can participate in the global storage system.

Note that the remote file is provided transparently to the client 1814, without requiring the installation and maintenance of special software on that client, which software needs to be capable of locating the file and providing it to the client. The client 1814 requests and interprets its result the same way as it would have if it had requested a file that was stored on the same site 1810.

Although various preferred embodiments have been described in detail above, those skilled in the art will readily appreciate that many modifications of the exemplary embodiment are possible without materially departing from the novel teachings and advantages of this invention. For example, the file switch/aggregator of the present invention may be implemented in an integral manner with a file server, comprising a network interface unit within the server's physical architecture. In addition, the inventive form of file aggregation may be accomplished by installing the functionality on the client and server members of a network in the form of a software driver compatible with the network node's operating system. These and other modifications are intended to be included in the definition of the invention, which invention should be limited only by the following claims.

What is claimed is:

1. A computer implemented method for aggregating file systems, comprising:
    coupling a group of client computers to a group of file servers through a file switch in a computer network;
    at the file switch, aggregating directories of multiple file systems in a plurality of file servers in the group of file servers by presenting them as a single directory to a respective client computer in the group of client computers; and
    at the file switch, aggregating file objects of the multiple file systems, each of the file objects having portions stored in different file servers, by presenting them as a single file object to a respective client computer in the group of client computers.

2. The method of claim 1, wherein the step of aggregating directories comprising:
    receiving a file create request from a client to create a user file; the file create request including a user file name and a user file path;
    selecting a set of file servers among the group of file servers for storing the user file;
    determining a server file path for each selected file server;
    storing, in the file switch, information identifying the set of file servers and the file paths corresponding to the user file; and
    updating the directories on the set of file servers to indicate storage of the user file.

3. The method of claim 2, further comprising:
    receiving a file access request from the client, the file access request including information identifying the user file;
    mapping the file access request with respect to the user file into a plurality of file requests directed to a plurality of file servers in the set of file servers, the mapping including reading the information identifying the set of file servers and the server file paths corresponding to the user file; and
    executing the file access request in accordance with the set of file servers and the server file paths corresponding to the user file.

4. The method of claim 2, wherein the step of determining includes mapping a user file path associated with the user file into a corresponding server file path in the set of file servers in accordance with a predetermined set of mapping rules.

5. The method of claim 1, wherein the step of aggregating file objects comprises:
    receiving a file object update request from a client, the file object update request includes a user file name and a user file path of a user file;
    selecting a set of file servers among the group of file servers in accordance with the user file name and the user file path;
    determining a server file path to access file objects corresponding to the user file for each file server in the set of file servers;
    storing, in the file switch, information identifying the set of file servers and the server file paths corresponding to the user file; and
    updating the file objects corresponding to the user file in the selected set of file servers.

6. The method of claim 5, wherein the step of aggregating file objects further comprises:

receiving a file object read request from a client, the file object read request includes the user file name and user file path;

mapping the file object read request into a plurality of file requests directed to a plurality of file servers in the set of file servers, the mapping including reading the information identifying the set of file servers and the server file paths corresponding to the user file;

retrieving file objects corresponding to the user file from a plurality of file servers in the set of file servers; and sending the file objects retrieved to the client.

7. The method of claim 5, wherein the file objects include at least two file objects selected from the set consisting of creation dates, last modification dates, file sizes, disk usage values, access control lists, security descriptors, and archive indicators.

8. A computer-implemented method for aggregating file systems, comprising:

coupling a group of client computers to a group of file servers through a file switch in a computer network; and at the file switch, aggregating a namespace of multiple file systems in a plurality of servers in the group of file servers by:

storing a set of name-mapping rules in the file switch; wherein the set of name-mapping rules includes a first rule for mapping a first set of user path names to server path names in a first server of the plurality of servers, and a second rule for mapping a second set of user path names to server path names in a second server of the plurality of servers;

receiving a file access transaction from a client, the file access transaction including a user file name and a user path name to a file in the group of file servers;

applying the set of name-mapping rules to the user path name to generate a server path name; and executing the file access transaction in accordance with the server path name.

9. The method of claim 8, wherein the name-mapping rules comprise:

a list of predefined user path names; and a corresponding list of mapped server path names.

10. The method of claim 9, wherein the step of applying comprises:

comparing the user path name to the list of predefined user path names; and if the user path name matches one of the predefined user path names, replacing the user path name with the corresponding mapped server path name from the list of mapped server path names.

11. A file switch for use in a computer network having a group of file servers and a plurality of client computers, wherein the plurality of client computers are coupled to the group of file servers through the file switch, the file switch comprising:

at least one processing unit configured to execute computer programs;

at least one port adapted to exchange information with the file servers and client computers, the information exchanged including information concerning a specified file data; and an aggregation module including one or more computer programs, the computer programs including instructions for:

at the file switch, aggregating directories of multiple file systems in a plurality of servers in the group of file servers by presenting them as a single directory to a respective client computer in the plurality of client computers; and at the file switch, aggregating file objects of the multiple file systems, each of the file objects having portions stored in different file servers, by presenting them as a single file object to a respective client computer in the plurality of client computers.

12. The file switch of claim 11, further including instructions for aggregating a namespace of multiple file systems in the group of file servers, the namespace aggregating instructions comprising instructions for:

storing a set of name-mapping rules in the file switch;

receiving, at the file switch, a file access transaction from a client, the file access transaction including a user file name and a user path name to a file in the group of file servers;

applying, at the file switch, the set of name-mapping rules to the user path name to generate a server path name; and executing the file access transaction in accordance with the server path name.

13. The file switch of claim 12, wherein the name-mapping rules comprise:

a list of predefined user path names; and a corresponding list of mapped server path names.

14. The file switch of claim 12, wherein the instructions for applying comprise instructions for:

comparing the user path name to the list of predefined user path names; and if the user path name matches one of the predefined user path names, replacing the user path name with the corresponding mapped server path name from the list of mapped server path names.

15. The file switch of claim 11, wherein the instructions for aggregating directories comprise instructions for:

receiving a file create request from a client, the file create request including a user file name and a user file path;

selecting a set of file servers among the group of file servers for storing the user file;

determining a server file path for each selected file server;

storing, in the file switch, information identifying the set of file servers and the server file paths corresponding to the user file; and updating the directory structure on the set of file servers to indicate storage of the user file.

16. The file switch of claim 15, further comprising instructions for:

receiving a file access request from the client, the file access request including the user file name;

mapping the file access request with respect to the user file name into a plurality of file requests directed to a plurality of file servers in the set of file servers, the mapping including reading the information identifying the set of file servers and the file paths corresponding to the user file; and executing the file access request in accordance with the set of file servers and the server file paths corresponding to the user file.

17. The file switch of claim 15, wherein the instructions for determining include instructions for mapping the user file path into a corresponding server file path in the set of file servers in accordance with a predetermined set of mapping rules.

18. The file switch of claim 11, wherein the instructions for aggregating file objects comprise instructions for:

receiving a file object update request from a client, the file object update request includes a user file name and a user file path of a user file;

selecting a set of file servers among the group of file servers in accordance with the user file name and the user file path;

determining a server file path to access file objects corresponding to the user file for each file server in the set of file servers;

storing, in the file switch, information identifying the set of file servers and the file paths corresponding to the user file; and updating the file objects corresponding to the user file in the selected set of file servers.

19. The file switch of claim 18, wherein the instructions for aggregating file objects further comprise instructions for:

receiving a file object read request from a client, the file object read request includes the user file name and user file path;

mapping the file object read request into a plurality of file requests directed to a plurality of file servers in the set of file servers, the mapping including reading the information identifying the set of file servers and the server file paths corresponding to the user file;

retrieving file objects corresponding to the user file from a plurality of file servers in the set of file servers; and sending the file objects retrieved to the client.

20. The file switch of claim 18, wherein the file objects include at least two file objects selected from the set consisting of creation dates, last modification dates, file sizes, disk usage values, access control lists, security descriptors, and archive indicators.

21. A file switch for use in a computer network having a group of file servers and a plurality of client computers, wherein the plurality of client computers are coupled to the group of file servers through the file switch, the file switch comprising:

at least one processing unit configured to execute computer programs;

at least one port adapted to exchange information with the file servers and client computers, the information exchanged including information concerning a specified file data; and an aggregation module including one or more computer programs, the computer programs including instructions for aggregating a namespace of multiple file systems in a plurality of servers in the group of file servers, the namespace aggregating instructions comprising instructions for:

storing a set of name-mapping rules in the file switch; wherein the set of name-mapping rules includes a first rule for mapping a first set of user path names to server path names in a first server of the plurality of servers, and a second rule for mapping a second set of user path names to server path names in a second server of the plurality of servers;

receiving, at the file switch, a file access transaction from a client, the file access transaction including a user file name and a user path name to a file in the group of file servers;

applying, at the file switch, the set of name-mapping rules to the user path name to generate a server path name; and executing the file access transaction in accordance with the server path name.

* * * * *